United States Patent
Takahara et al.

(10) Patent No.: US 9,732,249 B2
(45) Date of Patent: Aug. 15, 2017

(54) COMPOSITE MATERIAL, AND POLYMER COATING MATERIAL PRECURSOR PRODUCED USING SAME

(71) Applicant: Japan Science and Technology Agency, Saitama (JP)

(72) Inventors: Atsushi Takahara, Saitama (JP); Motoyasu Kobayashi, Saitama (JP); Hirohmi Watanabe, Saitama (JP)

(73) Assignee: Japan Science and Technology Agency, Siatama (JP)

(*) Notice: Subject to any disclaimer, the term of this patent is extended or adjusted under 35 U.S.C. 154(b) by 0 days.

(21) Appl. No.: 14/940,559

(22) Filed: Nov. 13, 2015

(65) Prior Publication Data

US 2016/0194513 A1 Jul. 7, 2016

Related U.S. Application Data

(63) Continuation of application No. PCT/JP2014/062515, filed on May 9, 2014.

(30) Foreign Application Priority Data

May 13, 2013 (JP) .................................. 2013/101214
Aug. 26, 2013 (JP) .................................. 2013/175035

(51) Int. Cl.
*C09D 129/02* (2006.01)
*C08F 291/04* (2006.01)
(Continued)

(52) U.S. Cl.
CPC .............. *C09D 129/02* (2013.01); *C08F 4/40* (2013.01); *C08F 212/14* (2013.01);
(Continued)

(58) Field of Classification Search
CPC .. C09D 129/02; C09D 127/22; C09D 193/00; C08F 2438/01; C08F 212/14;
(Continued)

(56) References Cited

U.S. PATENT DOCUMENTS 6,864,317 B1 * 3/2005 Kitano ..................... C08G 8/10
525/132
7,056,642 B2 * 6/2006 Kano .................... B41C 1/1016
430/271.1
(Continued)

FOREIGN PATENT DOCUMENTS

JP WO 0100702 A1 * 1/2001 ............. C08G 61/10
JP 2002194076 A 7/2002
(Continued)

OTHER PUBLICATIONS

Huang et al., Functionalization of Surfaces by Water-Accelerated Atom-Transfer Radical Polymerization of Hydroxyethyl Methacrylate and Subsequent Derivatization, Macromolecules, vol. 35, No. 4, 2002, pp. 1175-1179.*
(Continued)

*Primary Examiner* — Satya Sastri
(74) *Attorney, Agent, or Firm* — Duquette Law Group, LLC

(57) ABSTRACT

A novel material is provided herein which is suitable for use in a precursor of a polymer coating material that coats a polymer on a surface of a base material to provide the base material with surface modification and/or functionality assignment. A composite material characterized in that a compound having a polymerization initiation site containing a halogen group is incorporated in a crosslinked structure comprising a catechol derivative or a phenol derivative represented by the following formula (I). In the formula (I),
(Continued)

R may be interrupted by an oxygen molecule and represents a hydrocarbon group with 2 to 20 carbons that has at least one double bond site, and A represents a hydrogen atom, a hydroxyl group, or an alkoxy group with 1 to 20 carbons.

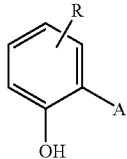

(I)

15 Claims, 11 Drawing Sheets

(51) Int. Cl.
| | |
|---|---|
| C08F 291/06 | (2006.01) |
| C08F 291/08 | (2006.01) |
| C08F 212/14 | (2006.01) |
| C09D 127/22 | (2006.01) |
| C08F 291/12 | (2006.01) |
| C08F 4/40 | (2006.01) |
| C08J 7/16 | (2006.01) |
| C08F 283/00 | (2006.01) |
| C08G 65/44 | (2006.01) |
| C09D 193/00 | (2006.01) |
| C09D 4/00 | (2006.01) |
| C08F 220/34 | (2006.01) |
| C09D 133/16 | (2006.01) |
| C08G 61/10 | (2006.01) |
| C09D 165/02 | (2006.01) |

(52) U.S. Cl.
CPC .......... *C08F 220/34* (2013.01); *C08F 283/00* (2013.01); *C08F 291/04* (2013.01); *C08F 291/06* (2013.01); *C08F 291/08* (2013.01); *C08F 291/12* (2013.01); *C08G 61/10* (2013.01); *C08G 65/44* (2013.01); *C08J 7/16* (2013.01); *C09D 4/00* (2013.01); *C09D 127/22* (2013.01); *C09D 133/16* (2013.01); *C09D 165/02* (2013.01); *C09D 193/00* (2013.01); *C08F 2438/01* (2013.01); *C08G 2261/135* (2013.01); *C08G 2261/1414* (2013.01); *C08G 2261/312* (2013.01); *C08G 2261/43* (2013.01); *C08G 2261/76* (2013.01)

(58) Field of Classification Search
CPC .... C08F 291/04; C08F 291/06; C08F 291/08; C08F 291/12; Y10T 428/31504; Y10T 428/31855
See application file for complete search history.

(56) References Cited

U.S. PATENT DOCUMENTS

| 9,346,971 | B2* | 5/2016 | Atanasova | A61L 27/34 |
|---|---|---|---|---|
| 2006/0173142 | A1* | 8/2006 | Nava | C08F 8/30 |
| | | | | 525/540 |
| 2008/0045686 | A1* | 2/2008 | Meagher | C08J 7/123 |
| | | | | 526/329.7 |
| 2012/0288550 | A1* | 11/2012 | Yoo | C09D 5/14 |
| | | | | 424/409 |

FOREIGN PATENT DOCUMENTS

| JP | 2002535450 A | | 10/2002 |
|---|---|---|---|
| JP | 2005511074 A | | 4/2005 |
| JP | 2006177914 A | | 7/2006 |
| JP | 2007527605 A | | 9/2007 |
| JP | 200856879 A | | 3/2008 |
| JP | 201057745 A | | 3/2010 |
| JP | 2010261001 A | * | 11/2010 |
| JP | 2010261001 A | | 11/2011 |
| JP | 2012532966 A | | 12/2012 |
| JP | 20136996 A | | 1/2013 |
| JP | 201318927 A | | 1/2013 |
| WO | 0100702 A1 | | 1/2001 |
| WO | 2009136510 A1 | | 11/2009 |

OTHER PUBLICATIONS

Zhao et al., Synthesis of Tethered Polystyrene-block-Poly(methyl methacrylate) Monolayer on a Silicate Substrate by Sequential Carbocationic Polymerization and Atom Transfer Radical Polymerization, J. American Chemical Society; vol. 121, No. 14, 1999, pp. 3557-3558.*

Ohno et al., Synthesis of Monodisperse Silica Particles Coated with Well-Defined, High-Density Polymer Brushes by Surface-Initiated Atom Transfer Radical Polymerization, Macromolecules, vol. 38, No. 6, 2005, pp. 2137-2142.*

International Search Report Dated Jul. 9, 2014 From Corresponding International Application No. PCT/JP2014/062515.

European International Search Report dated Dec. 16, 2016 from corresponding International Application No. EP 14 79 7411.7.

Michinari Kohri et al., "A colorless functional polydopamine thin layer as a basis for polymer capsules", Polymer Chemistry, vol. 4, No. 9, Feb. 28, 2013. p. 2696. Department of Applied Chemistry and Biotechnology, Chiba University, Japan.

Hirohmi Watanabe et al., "Scaffold for growing dense polymer brushes from a versatile substrate". ACS Applied Materials & Interfaces, vol. 6, No. 5, 2014, pp. 3648-3653. Japan Science and Technology Agency, Kyushu University, Fukuoka Japan.

Wenxi Huang et al., "Functionalization of surfaces by water-accelerated atom transfer radical polymerization of hydroxyethyl methacrylate and subsequent derivatization". Macromolecules, vol. 35, No. 4, 2002, pp. 1175-1179, Department of Chemistry, Michigan State University, Michigan.

Kohji Ohno et al., "Synthesis of monodisperse silica particles coated with well-defined, high-density polymer brushes by surface-initiated atom transfer radical polymerization". Macromolecules, vol. 38, No. 6, 2005 pp. 2137-2142, Institute for Chemical Research, Kyoto University, Japan.

Ryosuke Matsuno et al., "Polystyrene-grafted titanium oxide nanoparticles prepared through surface-initiated nitroxide-mediated radical polymerization and their application to polymer hybrid thin films". The royal society of chemistry, Soft Matter, vol. 2, pp. 415-421, 2006, Institute for Materials Chemistry and Engineering, Kyushu University, Japan.

Bin Zhao and William J. Brittan, "Synthesis tethered polystyrene-block-poly(methyl methacrylate) Monolayer on a silicate substrate by sequential carbocationic polymerization and atom transfer radical polymerization". J. American Chemical Society; vol. 121, No. 14, pp. 3557-3558, 1999, Department of Polymer Science, University of Akron, Ohio.

* cited by examiner

Br-containing Urushi
(Before Surface-Initiated Polymerization)

PMTAC brush on Urushi
(After Surface-Initiated Polymerization)

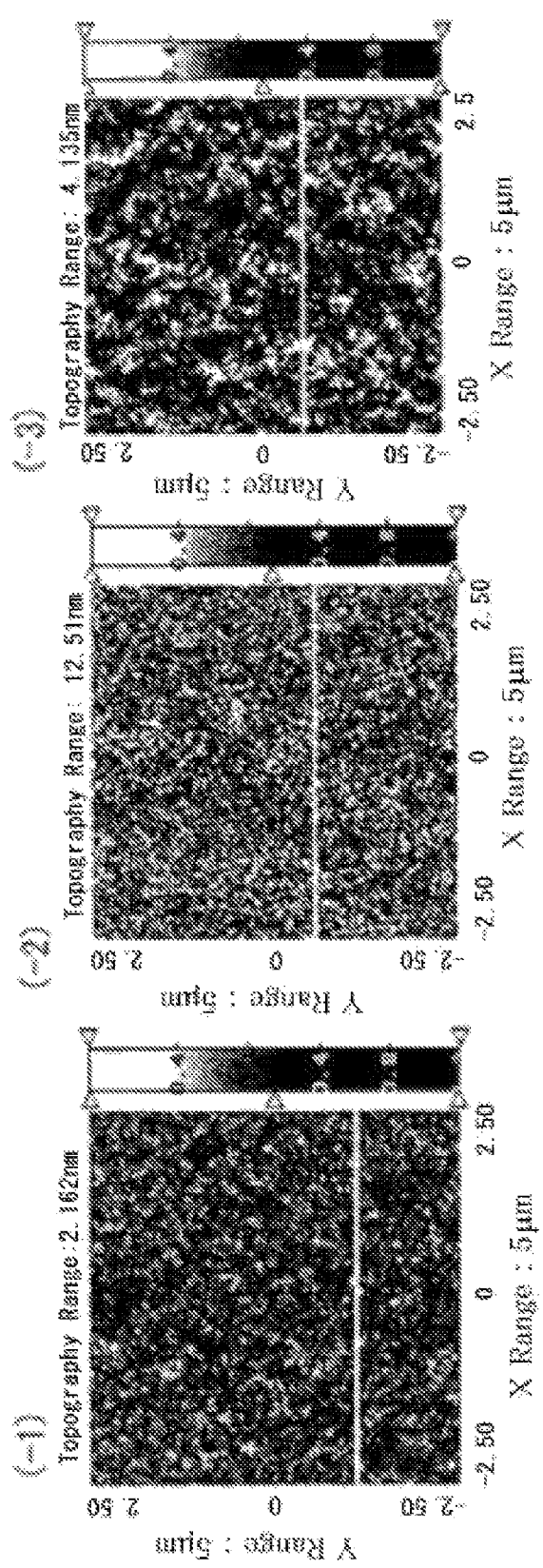
FIG. 1E(1) Before Immersion
FIG. 1E(2) After Immersion
FIG. 1E(3) After PMTAC Growth
FIG. 1E(4) The relation of position and height (Before Immersion)
FIG. 1E(5) The relation of position and height (After Immersion)
FIG. 1E(6) The relation of position and height (After PMTAC Growth)

FIG. 4A(1) Before Polymer Growth (AFM image)
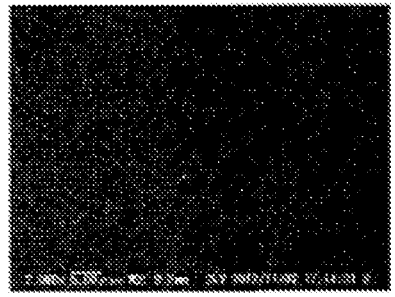
FIG. 4A(2) Before Polymer Growth (AFM image )
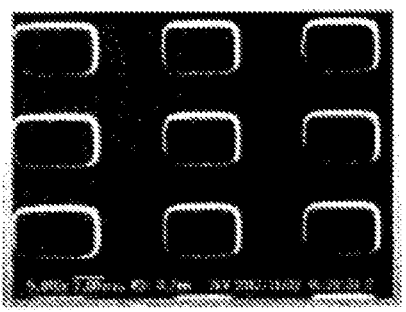
FIG. 4B(1) After Polymer Growth (AFM image)
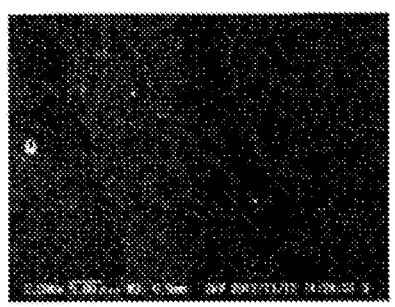
FIG. 4B(2) After Polymer Growth (AFM image )

FIG. 5A(1) Surface Roughness Measurement by AFM
(Topography Range: 2.977nm)
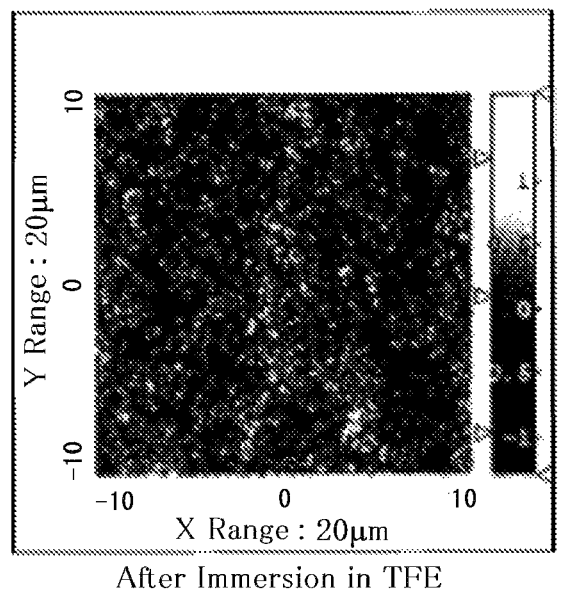
After Immersion in TFE
FIG. 5A(2) Surface Roughness Measurement by AFM
(Topography Range: 4.418nm)
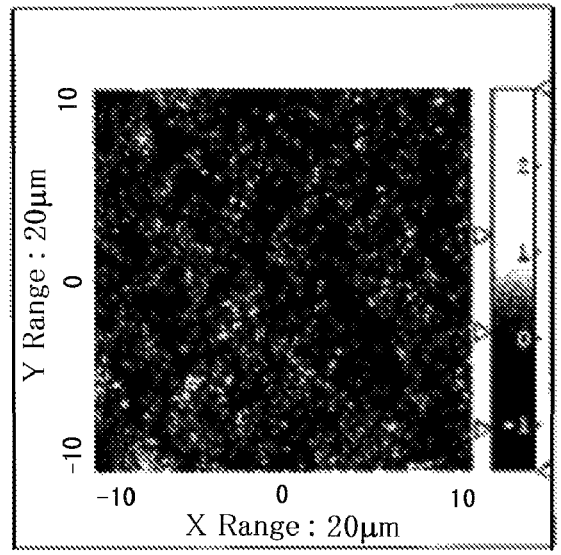
After Immersion in TFE FIG.5B   Immersion Effect Measurement by UV
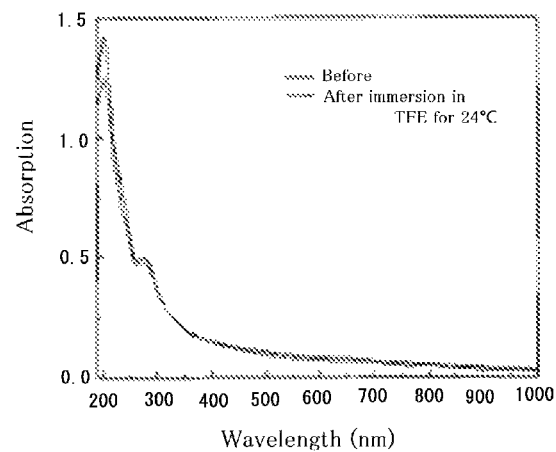
FIG.5C
Surface Observation by SEM
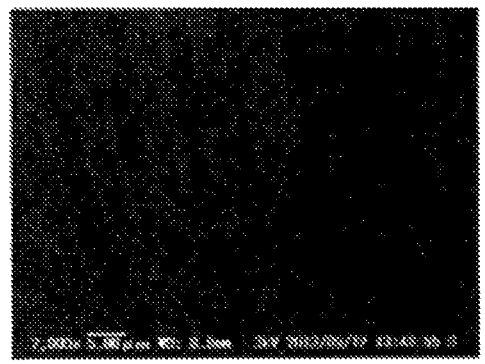
After Immersion in TFE FIG. 6A(1) Surface Roughness Measurement by AFM
(Before Immersion)
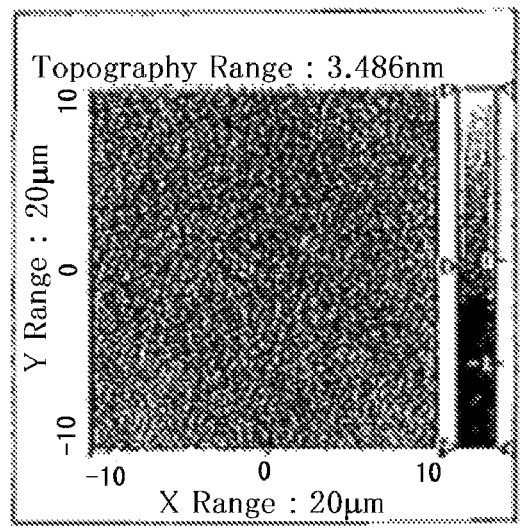
FIG. 6A(2) Surface Roughness Measurement by AFM
(After Immersion)
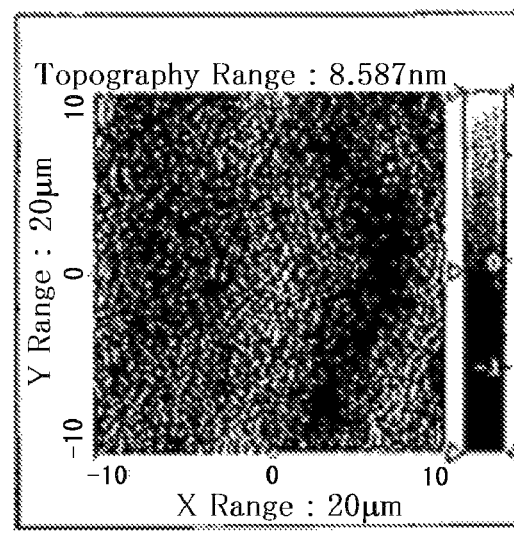

IR Spectra

UV Spectra

FIG. 7(A) Surface Observation by SEM
(Before Immersion)
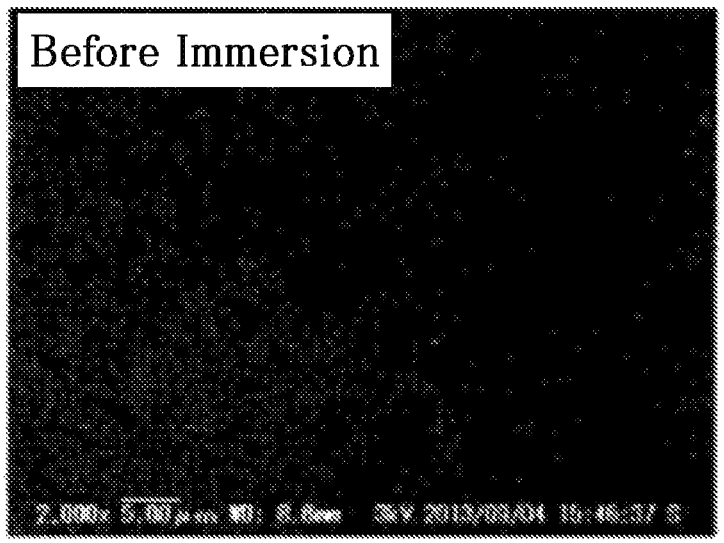
FIG. 7(B) Surface Observation by SEM
(After Immersion)
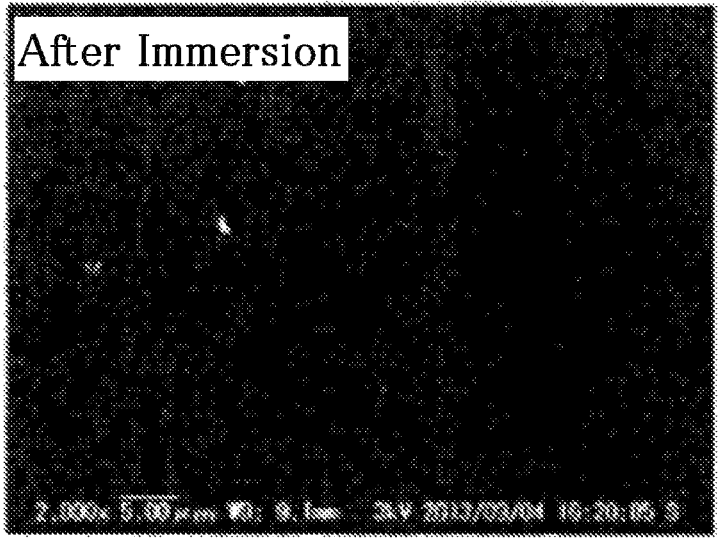

COMPOSITE MATERIAL, AND POLYMER COATING MATERIAL PRECURSOR PRODUCED USING SAME

RELATED APPLICATIONS

This patent application is a continuation of, and claims the benefit of, PCT International Application No. PCT/JP2014/062515, filed on May 9, 2014, entitled, "Novel Composite Material, and Polymer Coating Material Precursor Produced Using Same," which claims priority to Japanese Patent Application No. 2013-101214, filed on May 13, 2013 and which claims priority to Japanese Patent Application No. 2013-175035, filed on Aug. 26, 2013 the contents and teachings of each of which are hereby incorporated by reference in their entirety.

FIELD

The present invention relates to the technology for coating polymers on base materials to provide the base materials with surface modifications and assignment of functionalities such as, for example, wettability, abrasion resistance, anti-fouling property, and biocompatibility, and in particular it relates to novel composite materials used for precursors of such polymer coating materials and polymer coating material precursors using the same.

BACKGROUND

In recent years, as means for providing various materials (base materials) with surface modifications and functionality assignments, a surface graft polymerization method that graft-polymerizes a polymer on a surface of a base material has attracted attention. The method comprises two steps of (1) immobilizing a polymerization initiation group on the surface of the base material physically or chemically, and (2) performing a polymerization reaction beginning at the polymerization initiating group to produce a so-called polymer brush on the surface of the base material (for example, Patent Literature 1 and Patent Literature 2). The present invention relates to the technology corresponding to the step (1). Conventionally, in order to immobilize the polymerization initiating group on the surface of the base material, specific compounds having the polymerization initiating group have been applied to or adsorbed on the surface of the base material depending on the type of the base material.

For example, a silane coupling compound and a metal alkoxide have been used for base materials composed of glass or silicon (for example, Non-Patent Literature 1, Non-Patent Literature 2, Patent Literature 3, and Patent Literature 4), a thiol compound for gold-based materials (for example, Non-Patent Literature 3, Patent Literature 4, and Patent Literature 5), and an alkyl phosphoric acid for iron-based or aluminum-based material (Non-patent Literature 4). As seen from the above, it was necessary to select an appropriate compound depending on the material of the base material. For example, it was a fact that a compound, which was effective for base materials such as metal and glass, could not be applicable to a plastic or the like. Other than those above, a polymerization initiating group may be produced by sending radiation or ultraviolet rays to the surface of the base material (for example, Patent Literature 6). Although this method is also applicable to plastic, it has a problem that a portion of the surface of the base material is decomposed and a stable structure cannot be obtained.

Research group of the present inventors worked out earlier a surface-modified base material (polymer coating material precursor) prepared by forming a polydopamine film on a surface of a base material and immobilizing a polymerization initiator on the polydopamine film (Patent Literature 7). This technology is aimed at surface-modified base materials which can coat the surface of the base material with a polymer regardless of the material of the base material. It also undergo a two-step reaction of preparing the polydopamine film over time by oxidative polymerization of a dopamine solution at room temperature and then further immobilizing the initiator. Thus, it has a disadvantage of requiring long preparation time and being cumbersome. The technology described in Patent Literature 7 made an attempt to confirm applicability to base materials which are composed of silicon, metals such as aluminum and stainless steel, and plastic such as PTFE, but has not confirmed applicability to other plastics, for example, thermosetting resin such as phenol resin known for difficult modification.

CITATION LIST

Non-Patent Literature

NPL 1: B. Zhao and W. J. Brittain, J. Am. Chem. Soc., 1999, 121, 3557-3558

NPL 2: K. Ohno, T. Morinaga, K. Koh, Y. Tsujii and T. Fukuda, Macromolecules, 2005, 38, 2137-2142

NPL 3: W. Huang, J.-B. Kim, M. L. Brueningc G. L. Baker, Macromolecules, 2002, 35, 1175-1179

NPL 4: R. Matsuno, H. Otsuka and A. Takahara, Soft Matt., 2006, 2, 415-421

PATENT LITERATURE

PTL 1: Re-publication of PCT International Publication No. 2009/136510

PTL 2: Japanese Unexamined Patent Application Publication No. 2006-177914

PTL 3: Japanese Unexamined Patent Application Publication No. 2010-57745

PTL 4: Japanese Unexamined Patent Application Publication (Translation of PCT Application) No. 2002-535450

PTL 5: Japanese Unexamined Patent Application Publication (Translation of PCT Application) No. 2007-527605

PTL 6: Japanese Unexamined Patent Application Publication (Translation of PCT Application) No. 2005-511074

PTL 7: Japanese Unexamined Patent Application Publication No. 2010-261001

SUMMARY

Problems that Invention is to Solve

An object of the present invention is to solve the problems in the prior art described above and to provide polymer coating material precursors that are applicable to various base materials regardless of the material thereof in order to provide the base materials with the surface modifications and functionality assignments by coating polymers on the surface of the base materials, and in particular to provide novel materials that are suitable for use in the precursors.

Means for Solving Problems

The present inventors have found that the above objects can be achieved by using urushiol or its related substances and a compound with a specific structure having a polymerization initiation site, and have derived the present invention therefrom.

Thus, according to the present invention, a composite material is provided herein which is characterized in that a compound having a polymerization initiation site containing a halogen group is incorporated in a crosslinked structure comprising a catechol derivative or a phenol derivative represented by the following formula (I).

[Chemical formula 1]

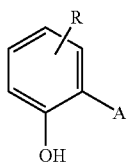

(I)

In the formula (I), R is in the 3- or 4-position, may be interrupted by an oxygen molecule, and represents a hydrocarbon group with 2 to 20 carbons that has at least one double bond site, and A represents a hydrogen atom, a hydroxyl group, or an alkoxy group with 1 to 20 carbons.

According to the present invention, a polymer coating material precursor is further provided herein which is characterized in that a cured film composed of the composite material as defined above is bonded to the base material.

According to the present invention, a polymer coating material is further provided herein which is characterized in that a monomer having a vinyl group has been subject to surface-initiated polymerization by atom transfer radical polymerization (ATRP) in which a halogen group present in the polymer coating material precursor as defined above is set as a polymerization initiation point, which results in surface modification.

According to the present invention, a method of manufacturing the composite material as defined above is further provided herein which is characterized by comprising a step of mixing the catechol derivative or the phenol derivative represented by the above formula (I) with the compound having the polymerization initiation site containing the halogen group and curing the resultant mixture.

Effect of Invention

The composite material of the present invention can be manufactured simply and in a short time in one-step reaction. The cured film composed of the composite material of the present invention can be bonded to various base materials such as plastics including phenolic resin, in addition to silicon substrate, metal, and glass, to serve as the polymer coating material precursor. The resulting polymer coating material precursor adheres firmly to the base material and furthermore is extremely stable.

BRIEF DESCRIPTION OF THE DRAWINGS

FIG. 1E(1) shows the results of AFM images before immersion in trifluoroethanol (TFE) for 24 hours at 60° C. in accordance with the present invention. FIG. 1E(2) shows the results of AFM images after immersion in trifluoroethanol (TFE) for 24 hours at 60° C. in accordance with the present invention. FIG. 1E(3) shows the results of AFM images after PMTAC growth in accordance with the present invention. FIG. 1E(4) shows the relation of position and height before immersion in trifluoroethanol (TFE) for 24 hours at 60° C. in accordance with the present invention. FIG. 1E(5) shows the relation of position and height after immersion in trifluoroethanol (TFE) for 24 hours at 60° C. in accordance with the present invention. FIG. 1E(6) shows the relation of position and height after PMTAC growth in accordance with the present invention.

FIG. 4A(1) shows an SEM image before surface-initiated polymerization of PMTAC for the polymer coating material precursor according to the present invention. FIG. 4A(2) shows an SEM image before surface-initiated polymerization of PMTAC for the polymer coating material precursor according to the present invention. FIG. 4B(1) shows an SEM image after surface-initiated polymerization of PMTAC for the polymer coating material precursor according to the present invention. FIG. 4B(2) shows an SEM image after surface-initiated polymerization of PMTAC for the polymer coating material precursor according to the present invention.

FIG. 5A(1) shows the results of AFM before immersion of the polymeric coating material precursor according to the present invention in solvent TFE for 24 hours at 60° C. FIG. 5A(2) shows the results of AFM after immersion of the polymeric coating material precursor according to the present invention in solvent TFE for 24 hours at 60° C. FIG. 5B shows the results of UV spectra before and after immersion of the polymeric coating material precursor according to the present invention in solvent TFE for 24 hours at 60° C. FIG. 5C shows an SEM image of the surface of the polymer coating material precursor according to the present invention.

FIG. 6A(1) shows the results of AFM before immersion of the polymer coating material precursor in accordance with the present invention in solvent TFE for 24 hours at 60° C. FIG. 6A(2) shows the results of AFM after immersion of the polymer coating material precursor in accordance with the present invention in solvent TFE for 24 hours at 60° C.

FIG. 7(A) shows an SEM image before immersion of the polymer coating material precursor in accordance with the present invention in solvent TFE. FIG. 7(B) shows an SEM image after immersion of the polymer coating material precursor in accordance with the present invention in solvent TFE.

DETAILED DESCRIPTION

Figure 1A:
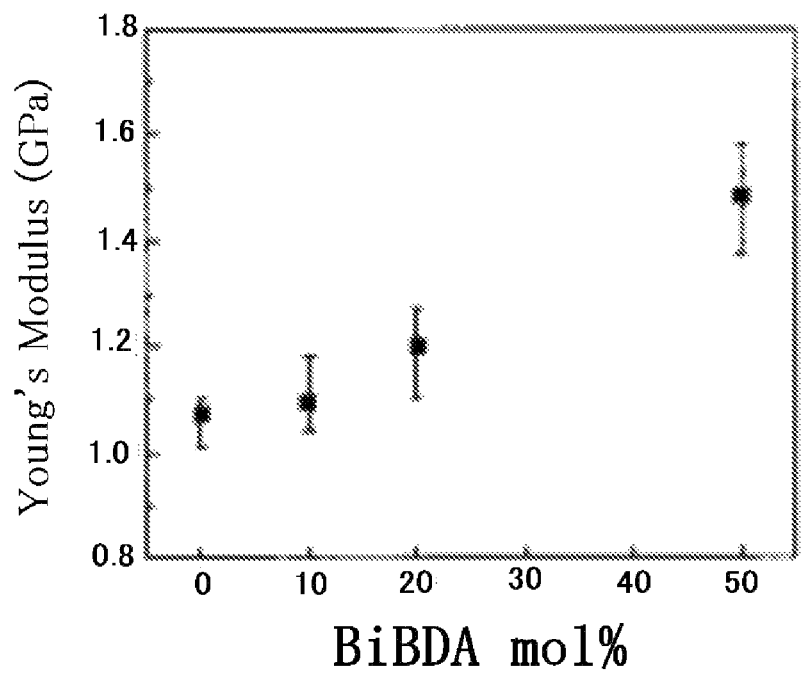
FIG. 1A shows the results of Young's modulus (GPa) obtained by the buckling method against the concentration (mol %) of bromo-containing catechol (BiBDA), which is an initiator, in the cured film of the present invention.

As is well known, urushiol contained in lacquer tree and other many plants of the Anacardiaceae is generally a catechol derivative having a hydrocarbon group with 15 to 17 carbons substituted. The hydrocarbon group has saturated type (alkyl group) and unsaturated type (alkenyl group and so on). Typically, the urushiol has both types mixed and the ratio varies depending on the species of raw materials.

A catechol derivative or a phenol derivative represented by the above formula (I) which is used for the composite material of the present invention, encompasses the above natural urushiol as well as its structural analogs (for example, artificial urushiol by synthesis, cardanol derived from a cashew nut, and so on). That is, in the formula (I), R is in the 3-position or 4-position, can be interrupted by an oxygen molecule, and represents a hydrocarbon group with 2 to 20 carbons, preferably 15 to 19 carbons that has at least one double bond site, whose examples are represented by the following formulae.

[Chemical formula 2]

—(CH$_2$)$_7$CH=CH(CH$_2$)$_5$CH$_3$         (i)

—(CH$_2$)$_7$CH=CHCH$_2$CH=CH(CH$_2$)$_2$CH$_3$         (ii)

—(CH$_2$)$_7$CH=CHCH$_2$CH=CHCH=CHCH$_3$         (iii)

—(CH$_2$)$_7$CH=CHCH$_2$CH=CHCH$_2$CH=CH$_2$         (iv)

—CH$_2$O$_2$C(CH$_2$)$_7$CH=CHCH$_3$CH=CH(CH$_2$)$_2$CH$_3$         (v)

—CH$_2$O$_2$C(CH$_2$)$_7$CH=CHCH$_2$
CH=CHCH$_3$CH=CH$_2$         (vi)

The hydrocarbon group represented by R of the formula (I) as described above may be mixed. As described above, a substituent of a side chain of the natural urushiol can be mixed with a saturated alkyl group [for example, —(CH$_2$)$_{14}$CH$_3$]. Such a natural urushiol can be used directly as a derivative of the formula (I). In this case, however, R to be used must contain a hydrocarbon group having at least one double bond site.

It is well known that the catechol derivative and the phenol derivative form a crosslinked structure via their OH group. The use of derivatives of the formula (I) containing the side chain (R) of the hydrocarbon group having the double bond site as described above, is important to form a strong and flexible crosslinked structure by thermal polymerization (to be described below).

For the reasons that stable polymer coating material precursors can be obtained and furthermore it has a good adhesion to base materials, for example, a particularly preferred derivative of the formula (I) which is used in the present invention, is urushiol represented by the following formula (III).

[Chemical formula 3]

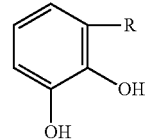

(III)

In the formula (III), R is the same as defined with respect to the formula (I). That is, R can be interrupted by an oxygen molecule, and represents a hydrocarbon group with 2 to 20 carbons, preferably 15 to 19 carbons that has at least one double bond site, whose examples are represented by the above formulae (i) to (vi), for example. Further, the above hydrocarbon group represented by R in the formula (III) can be mixed as in the case with using the natural urushiol. In this case, however, R to be used must contain a hydrocarbon group having at least one double bond site.

A composite material of the present invention is made by incorporating a compound, having a polymerization initiation site containing a halogen group, in a crosslinked structure comprising a catechol derivative or a phenol derivative represented by the formula (I). Thus, the composite material of the present invention has, by being bonded to a base material as a cured film, the cured film (thin film) having a polymerization initiator (polymerization initiating group), immobilized on the surface of the base material, and, by coating with various polymers (polymer brushes) later, can be used as a precursor of the polymer coating material which can provide materials with surface modifications and functionality assignments.

In order to obtain various polymers, which become polymer brushes, with a simple method, using the composite material of the present invention, a living radical polymerization is used. That is, the composite material of the present invention can have a halogenated alkyl structure having a halogen atom on a terminal carbon atom, as a polymer growing end, by applying the living radical polymerization, in particular an atom transfer radical polymerization (ATRP) (surface-initiated polymerization) which is excellent for use in graft polymerization of the polymer onto the surface of the base material.

The compound having the polymerization initiation site containing the halogen group according to the present invention, can be generally represented by the following formula (II).

[Chemical formula 4]

IA—SP—PI         (II)

(1) IA is a site for interacting with the catechol derivative or the phenol derivative, hereinafter also referred to as an interaction site. That is, this IA is the site that interacts (via a covalent bond) the catechol derivative or the phenol derivative represented by the formula (I). The presence of this IA allows an initiator (the compound having the polymerization initiation site) to be immobilized in the crosslinked structure comprising their derivatives, resulting that stable polymer coating materials are obtained without the elimination of the polymer brushes when it is polymerized later.

The present inventors have found that, as the IA, an atomic group derived from the catechol group or the phenolic group is considered useful, and, in addition to this, an atomic group derived from an organic silane such as trihalosilane and trialkoxysilane is also considered. Furthermore, it is also possible to use an atomic group derived from an amino group.

(2) PI is a site of starting point for initiation of polymerization and has a structure of an atomic group having a terminal halogen group, hereinafter also referred to as a polymerization initiation site.

(3) SP is a site that links these sites IA (the interaction site) and PI (the polymerization initiation site) together, and generally has a structure derived from chain alkyl amine or alkyl alcohol, hereinafter also referred to as a spacer.

Hereinafter, the compound having the polymerization initiation site containing the halogen group according to the present invention will be described more specifically.

(Compound Having a Polymerization Initiation Site Comprising a Halogen Group: No. 1)

A preferred example of the compound having the polymerization initiation site containing the halogen group according to the present invention is a compound in which IA is an atom group derived from a catechol group or a phenolic group, as described above, and can be represented by the following formula (II-1), for example.

[Chemical formula 5]

$IA_1\text{-}SP_1\text{—}PI_1$ (II-1)

In the formula (II-1), $IA_1$ can be represented by the following formula (VI-1) or (VI-2). The OH group derived from the catechol group or the phenol group is considered to interact with (bind covalently to) a catechol derivative or a phenol derivative.

[Chemical formula 6]

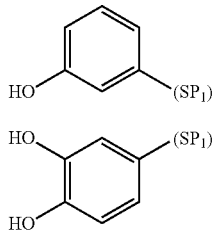

(VI-1)

(VI-2)

In the formula (II-1), $PI_1$ is the polymerization initiation site containing the halogen group and is represented by either the following formula (VII-1), (VII-2), or (VII-3).

[Chemical formula 7]

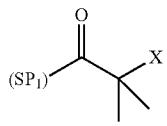

(VII-1)

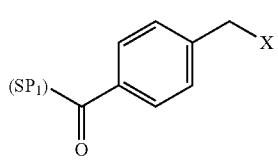

(VII-2)

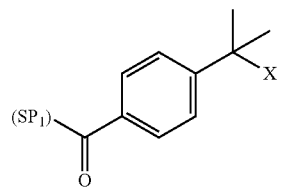

(VII-3)

In the above formulae, X represents a halogen atom, and is preferably a bromine atom or a chlorine atom in terms of ease in handling, and, in particular, is preferably a bromine atom in terms of reactivity.

In the formula (II-1), $SP_1$ is a spacer site that links the $IA_1$ with the $PI_1$ and is represented by the following formula (VIII-1) or formula (VIII-1').

[Chemical formula 8]

(VIII-1)

(VIII-1')

In the above formulae, n represents an integer of 0 to 10, and preferably carbon number is 1 to 8 in terms of ease of handling, and more preferably carbon number is 2 to 6.

The method of obtaining the above compounds can use a catechol derivative or a phenol derivative (for example, dopamine hydrochloride) as a precursor of $IA_1$ (interaction site) and 2-bromo isobutyryl bromide derivative or 4-bromomethyl-benzoic acid as a precursor of $PI_1$ (polymerization initiation site), for example.

For example, the compounds can be obtained by putting dopamine hydrochloride into methanol, and cooling by the addition of triethylamine, and then alternately adding a THF solution of 2-bromo isobutyryl bromide and a methanol solution of riethylamine, and mixing the resultant by stirring. In addition to this, the compounds can be obtained by putting dopamine hydrochloride into dimethylformamide (DMF), and adding triethylamine, and adding dropwise a DMF solution of N-hydroxysuccinimide and 4-bromomethyl benzoic acid, 1-ethyl-3-(3-dimethylaminopropyl) carbodiimide hydrochloride, and mixing the resultant by stirring.

The compound, thus obtained, having the polymerization initiation site comprising the halogen group suitable for use in the present invention, is represented by the following formula (IV), (V), (IV'), or (V'), for example, but is not limited thereto.

[Chemical formula 9]

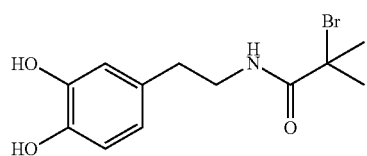

(IV)

-continued

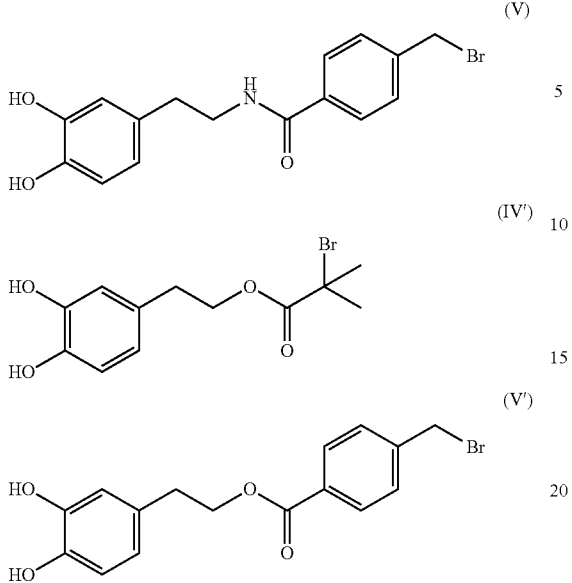

(Compound Having a Polymerization Initiation Site Comprising a Halogen Group: No. 2)

Another preferred example of the compound having the polymerization initiation site containing the halogen group according to the present invention is a compound in which IA is an atom group derived from an organic silane, as described above, and can be represented by the following formula (II-2), for example.

[Chemical formula 10]

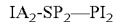
(II-2)

In the formula (II-2), $IA_2$ is represented by the following formula (VI-3) or (VI-4).

[Chemical formula 11]

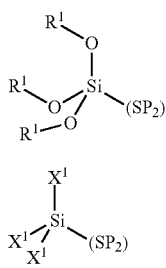

In the above formulae, $R^1$ represents an alkyl group having 1 to 6 carbons, and preferably carbon number is 1 to 5 in terms of ease of handling, and more preferably carbon number is 1 to 4, and more preferably carbon number is 1 or 2. Further, in the above formulae, $X^1$ represents a halogen atom, and is preferably a chlorine atom or a bromine atom, and is more preferably a chlorine atom. The alkyl group ($R^1$) and the halogen atom ($X^1$) are considered to interact with (bind covalently to) an OH group of the catechol derivative or the phenol derivative.

In the formula (II-2), $PI_2$ is the polymerization initiation site containing the halogen group and is represented by either the following formula (VII-1'), formula (VII-2'), or formula (VII-3').

[Chemical formula 12]

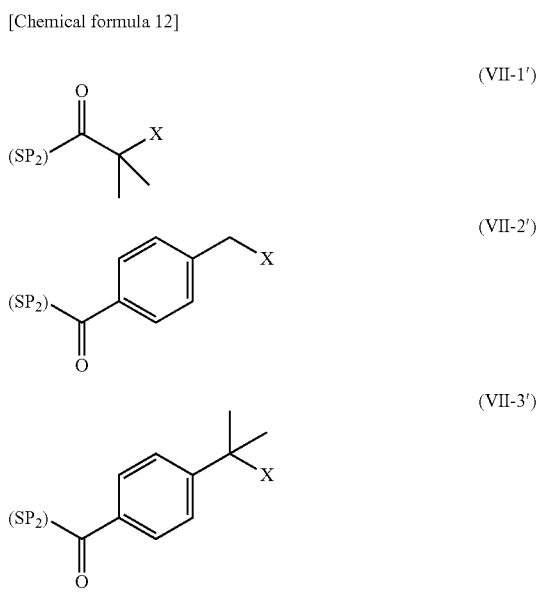

In the above formulae, X represents a halogen atom, and is preferably a chlorine atom or a bromine atom, and is more preferably a bromine atom.

In the formula (II-2), $SP_2$ is a spacer site that links the IA 2 with the $PI_2$ and is represented by the following formula (VIII-2) or formula (VIII-2').

[Chemical formula 13]

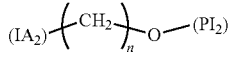
(VIII-2)

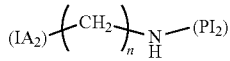
(VIII-2')

In the above formula, n represents an integer of 0 to 10, and preferably carbon number is 1 to 8 in terms of ease of handling, and more preferably carbon number is 2 to 6.

As the method of obtaining the above compound, the compound can be obtained using the following reaction, for example. First, alkyl alcohol such as 5-hexene-1-all, as a precursor of $SP_2$ (spacer), is mixed with 2-bromo isobutyryl bromide derivative or 4-bromomethyl benzoic acid, as a precursor of $PI_2$ (polymerization initiation site), by stirring and mixing (for example, 10 to 20 hours), under a non-polar solvent, and after drying, compound $SP_2$—$PI_2$ is obtained. Then, the obtained compound $SP_2$—$PI_2$ is mixed with a trihalosilane compound or a trialkoxy compound, as a precursor of $IA_2$ (interaction site), and after stirring and mixing (for example, 30 to 50 hours) under a catalyst containing platinum, the desired compound $IA_2$-$SP_2$—$PI_2$ is obtained.

The compound suitable for use in the present invention thus obtained (the compound having the polymerization initiation site comprising the halogen group) is represented by the following formula (IX), (X), or (XI), for example, but not limited thereto.

[Chemical formula 14]

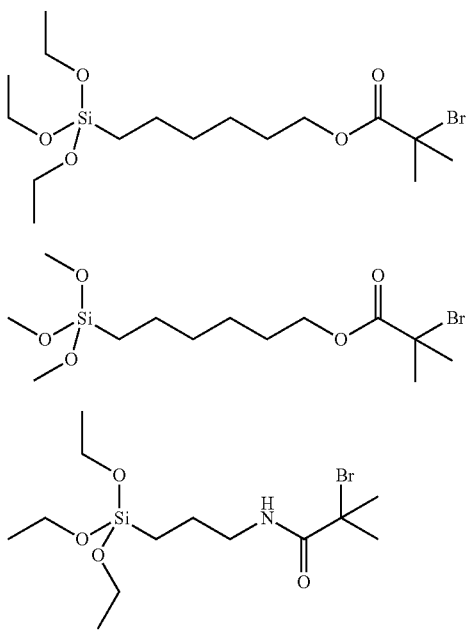

The composite material of the present invention is manufactured with a simple operation of mixing the catechol derivative (or the phenol derivative) represented by the formula (I) with the compound having the polymerization initiation site containing the halogen group and curing the resultant mixture.

In mixing, ultrasonic treatment is performed to ensure uniform dispersion. Curing is accomplished by subjecting a mixture of the catechol derivative (or the phenol derivative) of the formula (I) and the compound having the polymerization initiation site containing the halogen group to oxidizing condition and heating condition. That is, in the present invention, the mixture is heated such that polymerization by heat also occurs, in addition to polymerization by oxidation as in the case of coagulation (curing) of the urushiol. This thermal polymerization is generally carried out by heating to 60 to 180° C., preferably 100 to 120° C. This allows a strong and flexible crosslinked structure to be formed through the reaction between the double bonds present in the side chain (R) of the catechol derivative (or the phenol derivative) of the formula (I). The curing takes place very rapidly. For example, heating at 100° C. makes it sufficiently cured in 10 minutes.

In addition, although oxidative polymerization will also proceed by leaving coated material in the air as it is, it is possible to accelerate the oxidative polymerization by adding a catalyst [for example, iron acetate (II)] commensurate with the well-known oxidative enzyme laccase, or changing pH. However, these operations are not an essential condition.

Thus, it is possible to manufacture a polymer coating material precursor in which a cured film composed of the composite material of the present invention is bonded to a base material, by mixing a catechol derivative (or a phenol derivative) of the formula (I) with a compound having a polymerization initiation site containing a halogen group, and then coating the mixture on the surface of the base material, and curing the coating. Methods and conditions for mixing and curing are as described above. It is possible to apply, to the coating, various methods, known in the art, such as spin coating, dip coating, and casting method.

The polymer coating material precursor in accordance with the present invention obtained as described above has the features that a cured film composed of the composite material of the present invention is firmly bonded (attached) to various base materials regardless of their types and that in the cured film a compound having a polymerization initiation site is present stably and is not eliminated from the cured film (see Examples to be described).

Mechanism that the polymer coating material precursor in accordance with the present invention has such features has not been found in detail but is considered as follows: First, due to excellent adhesion (attachment) which is considered to be derived from an OH group of a catechol derivative or phenol derivative of the formula (I) as represented by urushiol, the catechol derivative or phenol derivative is firmly bonded (attached) to various base materials.

Then, it is considered that a compound having a polymerization initiation site containing a halogen group is bound to the catechol derivative or phenol derivative of the formula (I) probably via a covalent bond, and is incorporated into a crosslinked structure comprising these derivatives, as described above. Thus, the compound having the polymerization initiation site containing the halogen group (hence, polymerization initiating group) is not eliminated from the polymer coating material precursor, and, as a result, polymer brushes to be obtained in the case of subsequent polymerization are not eliminated, and stable polymer coating material is obtained.

In addition, the composite material of the present invention can also be used by, as described above, mixing a catechol derivative (or phenol derivative) of the formula (I) with a compound having a polymerization initiation site comprising a halogen group, and then coating the surface of a base material with the mixture and curing the same, and then detaching the cured film from the base material. Such a detachment from the base material may be included in the composite material of the present invention.

According to the present invention, materials can be provided with a variety of surface modifications and functionality assignments by polymerization (surface-initiated polymerization) of monomers to make polymer wherein a halogen group present in the polymer coating material precursor obtained in the way as described above is set as a polymerization initiation site. As such a polymerization, it is possible to use atom transfer radical polymerization (ATRP) as shown in Japanese Unexamined Patent Application Publication (Translation of PCT Application) No. 2007-527463, for example. As the monomers, a monomer having a vinyl group that produces a polymer by the atom transfer radical polymerization (ATRP) under the presence of a metal complex such as copper and iron, as is well known, that is, various monomers having acrylic acid site, methacrylic acid site, acrylamide site, styrene site, and so on, are applicable. It is possible to choose those having a structure corresponding to a desired surface modification property or functionality depending on the polymer.

For example, it is possible to obtain an polymer coating material having excellent surface hydrophilicity, by polymerizing 2-(methacryloyloxy) ethyl trimethyl ammonium chloride (MTAC) monomer represented by the following formula (XII) to make a polymer, resulting in a polyelectrolyte (PMTAC: poly [2-(methacryloyloxy) ethyltrimethylammonium chloride]).

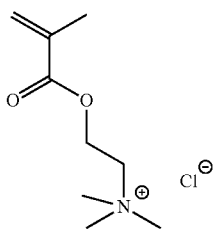

[Chemical formula 15]

The cured film comprising the composite material of the present invention can be formed on a base material of any shape such as an uneven shape or curved shape, not limited to a planar shape. That is, as described above, what to do is to coat the surface of a base material of any shape with a mixture of a catechol derivative or phenol derivative of the formula (I) and a compound having a polymerization initiation site comprising a halogen group, and to cure the coating. In addition, on this occasion, it is also possible to make the cured film itself have any surface shape by completing curing after pushing (pressing) a mold of an arbitrary shape against the mixture of the catechol derivative or phenol derivative with which the surface of the base material has been coated and the compound having the polymerization initiation site comprising the halogen group, before complete curing of the mixture.

Thus, according to the present invention, a polymer coating material (surface modifying material) is obtained in which polymer brushes are produced by forming a cured film of the composite material according to the present invention, of any shape, on the surface of various base materials of any shape, and then making polymerization later. As a result, according to the present invention, it is possible to provide stable polymer coating (polymer brushes) for the front and back and the inner and outer surfaces of daily commodities of various shapes (for example, dishes) and various materials such as building material (for example, pipes) so as to exhibit desired surface characteristics and functionality according to respective products and materials.

The amount of the initiator (compound having the polymerization initiation site), used in the present invention, for the catechol derivative or phenol derivative of the formula (I) can be appropriately selected depending on the desired surface modification and functionality. In general, a certain amount (for example, not less than 10 mol %) is necessary to function as an initiator.

Hereinafter, Examples will be given to more specifically describe the features of the present invention. However, the present invention is not limited by these Examples.

Example 1

Synthesis of a Compound Having a Polymerization Initiation Site Containing a Halogen Group ($IA_1$-$SP_1$—$PI_1$) (1)

As a compound having a polymerization initiation site containing a halogen group ($IA_1$-$SP_1$—$PI_1$), 4-(2-(2-bromo-isobutyryl) amino-ethyl) benzene-1,2-diol (BiBDA) represented by the formula (IV) wherein X is bromine atom (Br), was synthesized.

At the beginning, dopamine hydrochloride (2.0 g, 10.5 mmol) was added to 20 ml of methanol to obtain a cloudy suspension. By adding 1.46 ml of triethylamine (10.5 mmol) to this cloudy suspension, a clear solution was obtained. After cooling this solution to 0° C., a THF solution (2 ml) of 2-bromo-isobutyryl bromide (1.3 ml; 10.5 mmol) and a methanol solution (2 ml) of triethylamine (2.19 ml: 15.8 mmol) were added alternately little by little. During this process, pH of the solution was kept at 9. Then, the solution was heated to room temperature, and was stirred for one hour. Then, by removing methanol and the like using an evaporator, a crude product of the target compound was obtained. The resulting crude product was redissolved in 50 ml of chloroform, and was purified by washing sequentially with 1N of hydrochloric acid aqueous solution, water, and saturated sodium chloride aqueous solution. Then, the resulting solution was subjected to the addition of $Na_2SO_4$ and was left overnight to remove water, and was further filtered and dried under vacuum to obtain the target compound ($IA_1$-$SP_1$—$PI_1$), bromo-containing catechol compound (BiBDA).

Example 2

Preparation of a Polymer Coating Material Precursor Containing a Polymerization Initiator Such urushiol was used that R in the above formula (III) is represented by (iii) as described above. At the beginning, iron acetate (II) (0.75 mmol) was mixed with an ethanol dilute solution of urushiol (1.2 mmol). As a result of this mixing, the solution was changed in color from brown to black at this point. Then, to this urushiol was added the bromo-containing catechol compound (0.3 mmol) which was synthesized in Example 1. The resulting mixture was subjected to an ultrasonic homogenizer (Branson Sonifier ultrasonic cell disruptors) treatment. The resulting solution was applied (coated) to a silicon substrate as a base material by spin-coating method (3000 rpm) to form a thin film. Then, after 10 minutes heating at 100° C., an applied film having a thickness of about 1 micron was obtained. The thickness of the applied film was measured through observation by atomic force microscope (AFM) with the Agilent 5500 microscope from Agilent. In the atomic force microscope (AFM) observation, the OMCL-AC160TS-W2 from Olympus was used as a standard cantilever, and the observation was performed in the non-contact AC mode.

<Mechanical Strength Measurement>

In order to adjust the amount of bromo group which becomes a polymerization initiation point (a polymerization initiator), the amount of bromo-containing catechol (BiBDA) to urushiol was varied. Iron acetate (II) was added to be a half of the total amount of urushiol and bromo-containing catechol compound. FIG. 1A shows the results of Young's modulus (GPa) obtained by the buckling method specific to a thin film of nanometer thickness ("strain-induced elastic buckling instability for mechanical measurements (SIEBIMM)") against the concentration (mol %) of bromo-containing catechol (BiBDA), which is an initiator, in the cured film of the present invention. At the beginning, a thin film in a self-supporting state was attached on a polydimethylsiloxane (PDMS) substrate (about 1 cm square) whose Poisson's ratio and Young's modulus are known. This sample was gradually compressed using a micro caliper (Mitutoyo, No. 406-250). The spacing of wrinkles generated during this time was determined from observation by optical microscope and Young's modulus ($E_f$) was determined according to the expression as shown below.

$$\text{Young's Modulus}(E_f) = \frac{3E_s \times (1 - v_f^2)}{(1 - v_s^2) \times \left(\frac{d}{2\pi h}\right)^3} \quad \text{[Expression 1]}$$

Here, $E_s$ is Young's modulus of a polydimethylsiloxane (PDMS) substrate, $v_f$ and $v_s$ are Poisson's ratios of the thin film and the polydimethyl siloxanes (PDMS), d is the observed spacing of wrinkles, and h is a thickness of the thin film.

Figure 1B:
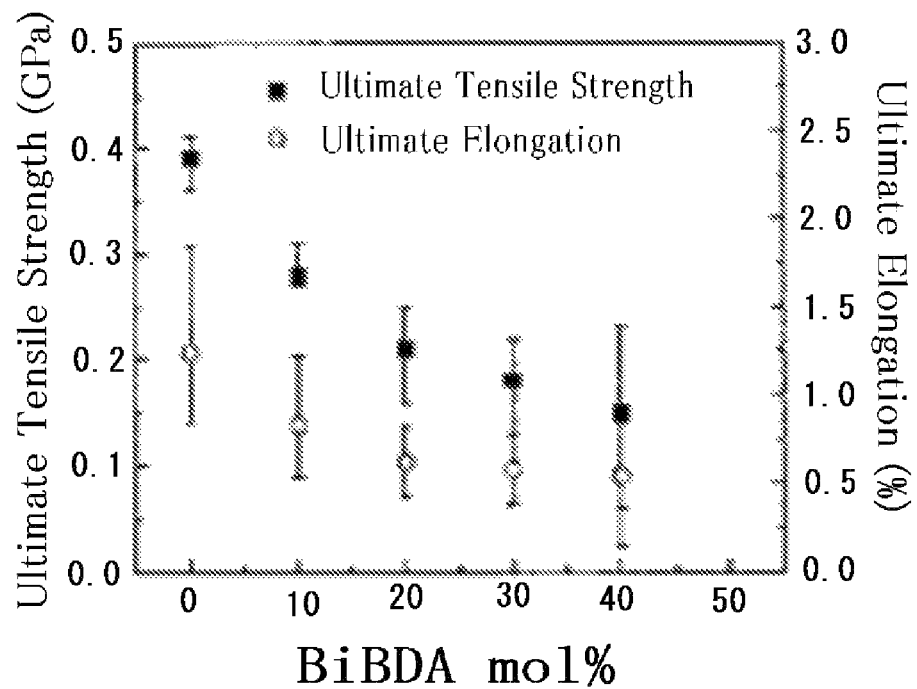
FIG. 1B shows the results of tensile strength (GPa) obtained by the bulge test against the concentration (mol %) of bromo-containing catechol (BiBDA), which is an initiator, in the cured film of the present invention.

FIG. 1B shows the results of tensile strength (GPa) obtained by the bulge test against the concentration (mol %) of bromo-containing catechol (BiBDA), which is an initiator (a compound having a polymerization initiation site), in the cured film of the present invention. The bulge test was conducted using a self-made apparatus. This apparatus is a bulge test apparatus dedicated to a thin film of nanometer thickness. As a specific method of measurement, a thin film in a self-supporting state was first attached on a copper plate with a hole. Then, this was placed on the self-made apparatus and an air pressure was gradually applied to the thin film through the hole in the copper plate. The air pressure was precisely controlled through a self-made regulator. At this time, the swelling behavior of the thin film was determined through observation by erecting optical microscope (ECLIPSE 80i) from Nikon and the pressure was determined using a pressure gauge (AS-ONE M-382 Manometer). Then, ultimate tensile strength and ultimate elongation were determined according to the expressions as shown below.

$$\text{Ultimate Tensile Strength}(\sigma) = \frac{P \times a^2}{4 \times h \times d} \quad \text{[Expression 2]}$$

$$\text{Ultimate Elongation}(\varepsilon) = \frac{2 \times d^2}{3 \times a^2} \quad \text{[Expression 3]}$$

Here, P is a pressure, a is a radius of a hole, this time 0.5 mm, h is a thickness of a thin film, d is a height of a bulge just before the thin film ruptures. In FIG. 1B, white circles show the results of the ultimate elongation, and black squares show the results of the ultimate tensile strength (UTS).

These test results have revealed that the cured film of the present invention has the property that Young's modulus increases but ultimate elongation and ultimate tensile strength (UTS) decrease as the concentration of the bromo-containing catechol (BiBDA), which is the initiator (the compound having a polymerization initiation site). Since the cured film of the present invention has thus the feature that Young's modulus increases as the ratio of the initiator (compound having a polymerization initiation site), bromo-containing catechol compound (BiBDA) increases, it is understood that a certain amount (for example, not less than 10 mol %) is necessary to obtain a practical hard polymer coating precursor.

From the above test results, what was prepared under the condition that the ratio of bromo-containing catechol to urushiol is 20 mol %, that is, under the condition of urushiol (1.20 mmol), bromo-containing catechol compound (0.30 mmol), and iron acetate (II) (0.75 mmol) was adopted as a suitable cured film (polymer coating material precursor).

<XPS Measurement>

Figure 1C:
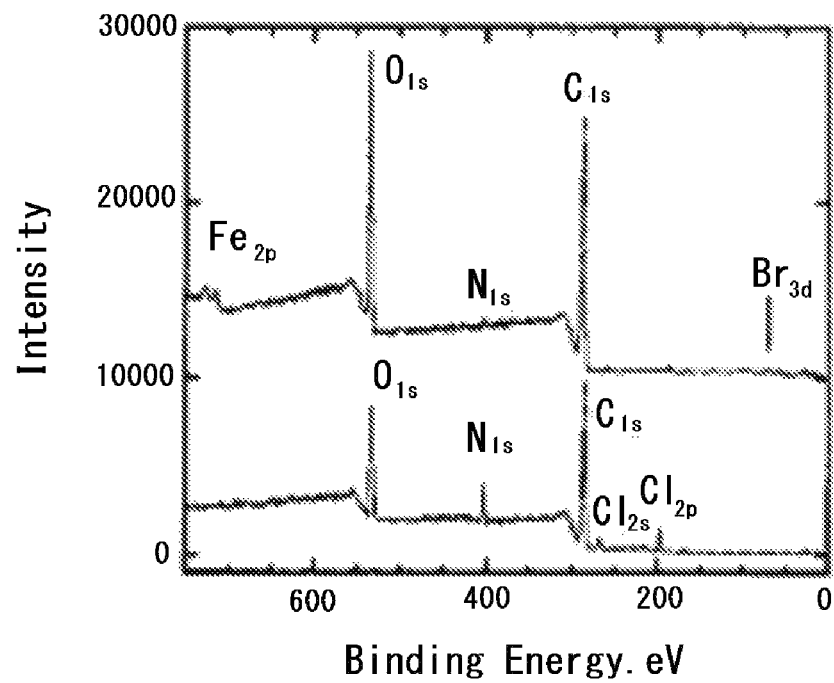
FIG. 1C shows the results of XPS measurement before and after initiation of surface polymerization in accordance with the present invention.
Figure 1D:
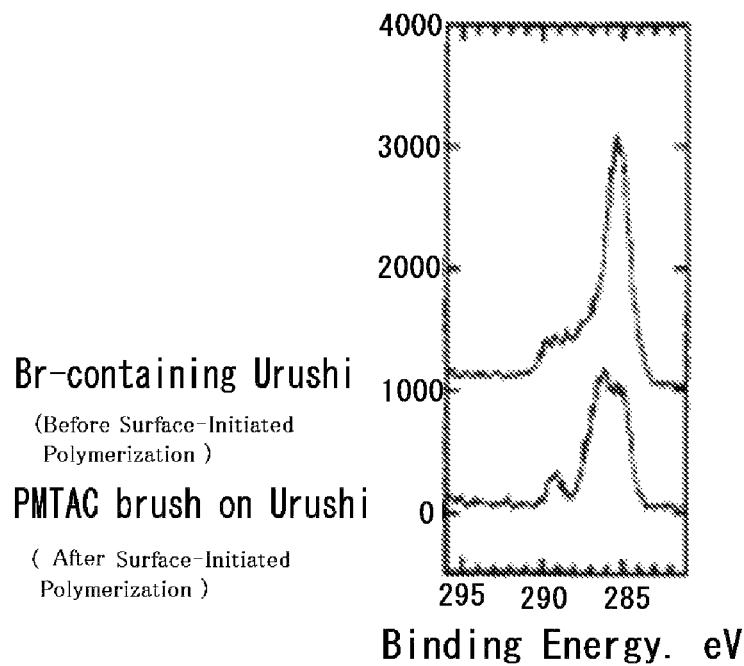
FIG. 1D is an enlarged view of a portion of FIG. 1C.

The resulting cured film XPS measurement results are shown in the upside of FIGS. 1C and 1D. Incidentally, X-ray photoelectron spectroscopy analysis was performed using XPS-APEX from Physical Electronics. Its X-ray source is monochrome Al-Kα, its output is 150 W, and its degree of vacuum is $1 \times 10^{-6}$ Pa. Angle of emergence was fixed at 45°. As shown in the figures, peaks of $C_{1S}$, $O_{1S}$, $N_{1S}$, and $Br_{3d}$ which correspond to the composition of urushiol and bromo-containing catechol compound were detected, and in particular the peak of Br was confirmed in the vicinity of 70 eV.

<IR Spectrum Measurement>

Figure 2A:
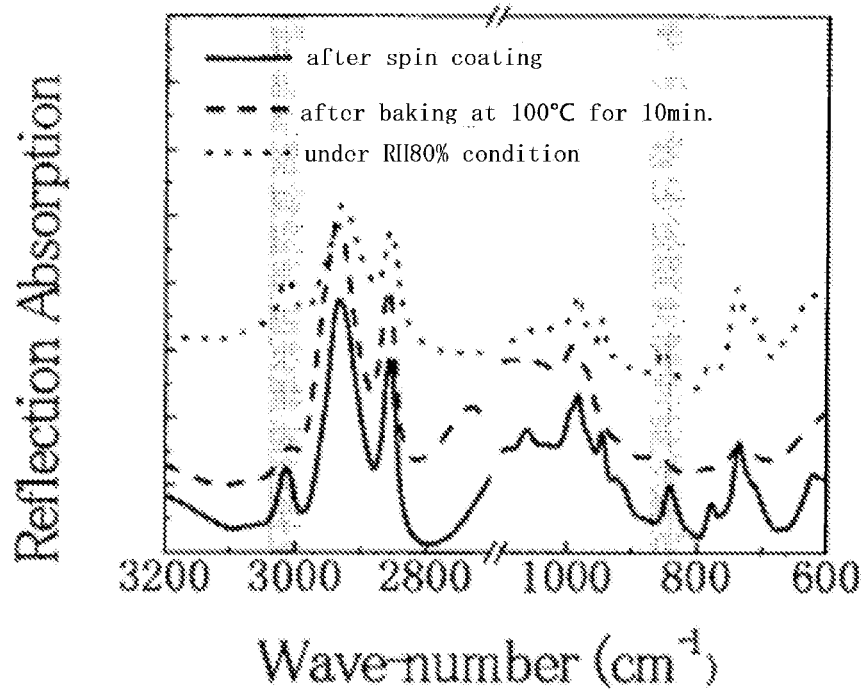
FIG. 2A shows the results of IR Spectrum measurement of a polymeric coating material precursor thin film of the present invention which was fabricated by spin coating, before and after 10 minutes heating at 100° C.

In addition, the infrared absorption spectrum (IR) Spectrum measurement results immediately after spin coating and after 10 minutes heating at 100° C. are shown in FIG. 2A. Incidentally, infrared absorption spectra (IR) Spectrum measurement was performed using VERTEX 70 spectrophotometer from Bruker Optics equipped with Seagull (from Harrick Scientific) as a reflection measurement kit. As shown in the figure, the IR Spectrum measurement has revealed that unsaturated double bonds of 3015 $cm^{-1}$ and 945 $cm^{-1}$ have disappeared, and it has been confirmed that crosslinked structure has been formed by the 10 minutes heating at 100° C. The formation of crosslinked structure has been also confirmed from the phenomenon of no scratching of the cured film by pencil hardness test.

<Solvent Resistant Test>

Solvent resistant test was performed for the case that the polymer coating material precursor obtained in the way as described above was immersed in water, methanol, ethanol, dimethyl sulfoxide (DMSO), toluene, chloroform, acetone, tetrahydrofuran (THF), N,N-dimethyl formamide (DMF), and trifluoroethanol (TFE) for 12 hours at room temperature, and for the case that it was immersed therein for one hour at 60° C. In either case, no change in the cured film was observed and XPS measurement results were the same as those before this test and the detection of the peak of $Br_{3d}$ was also confirmed. Further, even after 24 hours immersion in these solvents at 60° C., no detachment from the base material was observed.

Moreover, for each of the above solvents, additional solvent resistant test was performed for the case of 24 hours immersion at room temperature and for the case of 24 hours immersion at 60° C. The results are shown in the following table.

TABLE 1

| Solvent | Room temperature, 24 hours | 60° C., 24 hours |
| --- | --- | --- |
| Water | No change | No change |
| Methanol | No change | No change |
| Ethanol | No change | No change |
| THF | 5 hours (detachment) | 1 hours (detachment) |
| DMF | 1 hours (detachment) | 1 hours (detachment) |
| DMSO | No change | No change |
| Toluene | No change | No change |
| Chloroform | No change | No change |
| Acetone | No change | No change |
| TFE | No change | No change |

The obtained results showed good adhesion ability. In particular with respect to the solvents other than THF and DMF, no change in the cured film was observed after a long period of time had elapsed. These results demonstrated that the cured film is insoluble and infusible by the crosslinked structure for general solvents and therefore suggest that the cured film of the present invention is useful as a method of immobilizing a compound having a polymerization initiation site containing a halogen group on the surface of a base material and effective as a scaffold for immobilizing a polymerization initiating group.

Further, when the surface of the cured film before and after the immersion was observed with an atomic force microscope (AFM), surface roughness in both cases was about three nanometers in root-mean-square (RMS) value.

The observation by atomic force microscope (AFM) was performed using Agilent 5500 microscope from Agilent. In addition, the results of the XPS measurement in both cases also showed the detection of peaks of $C_{1S}$, $O_{1S}$, $N_{1S}$, and $Br_{3d}$ which correspond to the composition of urushiol and bromo-containing catechol compound.

As an example of AFM images, FIG. 1E(1) and FIG. 1E(4) shows the results before polymer brushes were immersed in the solvent TFE for 24 hours at 60° C. while FIG. 1E(2) and FIG. 1E(5) shows the results after polymer brushes were immersed in the solvent TFE for 24 hours at 60° C. From these results, it was confirmed that there is no change in surface shape before and after the immersion.

<Application to Other Base Materials>

As the base material, stainless steel, copper plate, glass, ceramic, silicon substrates (vacuum UV treatment), acrylic resin, phenolic resin, melamine resin, polystyrene (PS), polypropylene (PP), polyethylene (PE), and polyethylene terephthalate (PET) were used to apply the polymer coating material precursor on these base materials, under the above conditions, with a spin coating method or a casting method. With respect to the adhesion between the cured film and the base material obtained in each case of the spin coating method (film thickness of 80 nm) and casting method (film thickness of 4 to 5 μm), the following table shows the results of the test on a six-point scale [0 (bad) to 5 (excellent)] by the method of ASTM D3359.

TABLE 2

| Base material | Spin coating method | Casting method |
| --- | --- | --- |
| Stainless steel | 4 | 4 |
| Copper plate | 3 | 4 |
| Glass | 5 | 5 |
| Ceramic | 2 | 4 |
| Silicon substrates (vacuum UV treatment) | 5 | 5 |
| Acrylic resin | 5 | 5 |
| Phenolic resin | 4 | 4 |
| Melamine resin | 4 | 4 |
| PS | 5 | 5 |
| PP | 5 | 4 |
| PE | 5 | 4 |
| PET | 4 | 4 |

The obtained results showed good adhesion ability with no detachment, yet no significant change in the cured film observed, regardless of the type of base materials. From these results, the cured film is considered to have high attachment property to the base material due to the catechol skeleton.

Example 3

Preparation of Polymer Coating Material (Surface Modifying Material)

The cured film (polymer coating material precursor) prepared in Example 2 was used to set a bromo group contained in the cured film as a polymerization initiation point and perform surface-initiated polymerization of 2-(methacryloyl) ethyl trimethyl ammonium chloride (MTAC) represented by the above formula (V). The resulting polymer, polymer electrolyte (PMTAC) was grafted on the surface of the cured film.

The precursor, 0.1 mmol of CuBr, and further 4,4-dimethyl-2,2-bipyridine (0.2 mmol) were added in a flask, and argon substitution and degassing were alternately repeated three times. Then, a methanol solution of MTAC polymer of 1.01 M was added, and argon substitution and degassing were alternately repeated three more times. Then, polymerization was performed at 30° C. under the argon substitution. After 12 hours later, the solution was exposed to air to stop reaction. The obtained sample was subjected to Soxhlet extraction with methanol over 12 hours to remove polymers and the like which were physically attached on the surface of the cured film. Then, by drying the obtained base material for one hour at 30° C., the target polymer coating material (surface modifying material) with grown polymer brushes was obtained.

The XPS measurement results of the obtained polymer coating material are shown in the downside of FIGS. 1C and 1D as described above. As mentioned earlier, in the case of the XPS measurement before surface-initiated polymerization (see the upside), peaks corresponding to the composition of urushiol and bromo-containing catechol compound which serve as a starting material were detected, while, in the case of the surface after the surface-initiated polymerization, peaks of $C_{1S}$, $O_{1S}$, $N_{1S}$, and $Cl_{2p}$ were detected and its ratio was consistent with the theoretical composition ratio of PMTAC. Therefore, the surface of the cured film is considered to be coated with PMTAC graft layer.

Figure 2B:
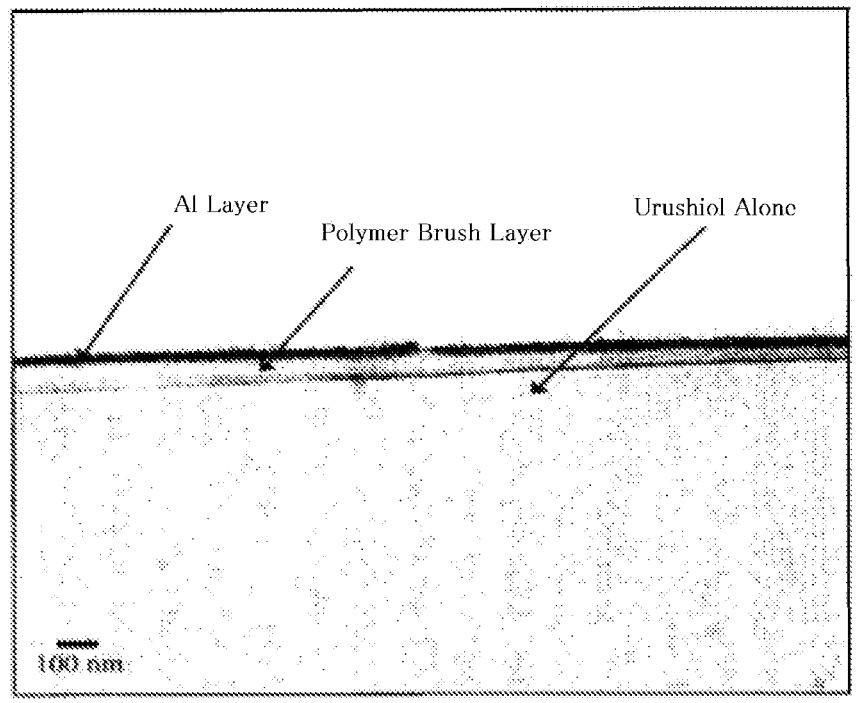
FIG. 2B shows a TEM image of the cross section of a polymer coating material (surface modifying material) after surface-initiated polymerization in accordance with the present invention.

Further, after the obtained polymer coating material were added in various solvents mentioned in Example 2 as described above and were let stand, change in surface shape was observed by AFM. In most of the solvents, there was no change before and after 24 hours immersion at 60° C. This is considered to result from the strong adhesion of the crosslinked structure and catechol structure. FIG. 2B shows an example of a TEM image of the obtained polymer coating material (surface modifying material). It was confirmed that the layer of brushes were present independently of the layer of the cured film.

<Contact Angle Measurement>

Figure 3A:
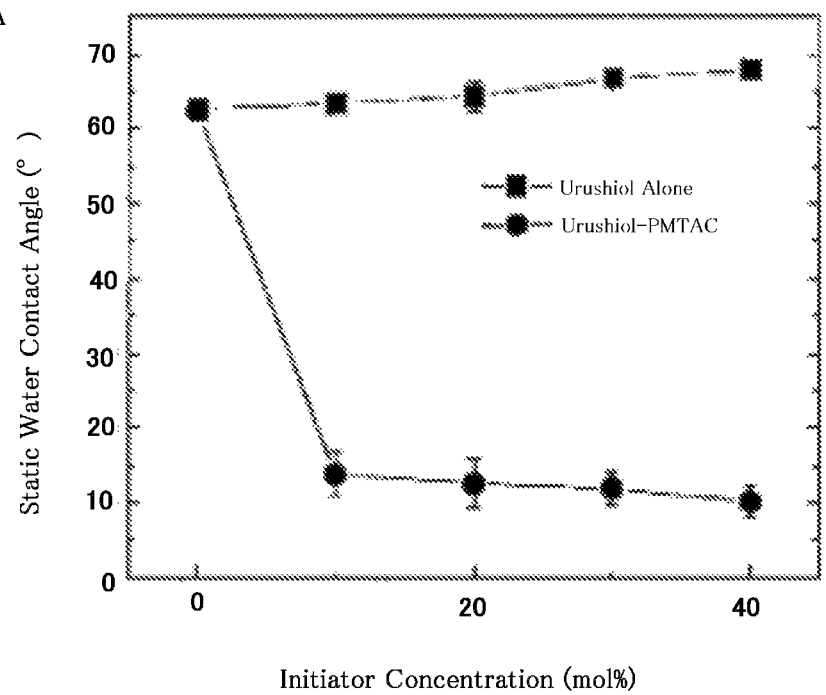
FIG. 3A shows the measurement results of static water contact angle of the cured film surface in accordance with the present invention, in the case before surface-initiated polymerization and in the case after surface-initiated polymerization in which PMTAC polymer brushes had been grown from the cured film surface, depending on concentration of the initiator bromo-containing catechol (BiBDA).
Figure 3B:
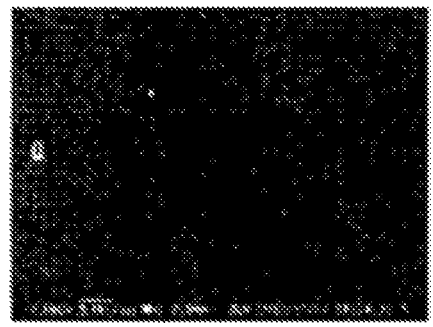
FIG. 3B shows an SEM image of the cured film surface after surface-initiated polymerization in accordance with the present invention.

FIG. 3A shows the measurement results of static water contact angle of the cured film surface according to the present invention, in the case before the surface initiated polymerization (urushiol alone, polymer coating material precursor) and in the case after the surface-initiated polymerization in which PMTAC polymer brushes had been grown from the cured film surface (polymer coating material), depending on concentration of the initiator bromo-containing catechol (BiBDA). Static contact angle measurement was performed with DSA 10 contact angle measuring apparatus from Kruess equipped with an automated droplet dropping mechanism and a monochrome CCD. The measurement was performed at the temperature of 23.5° C. and at the humidity of 60%. Contact angle before polymerization was almost constant in the vicinity of 65° independently of the concentration of the initiator (the compound having a polymerization initiation site), bromo-containing catechol (BiBDA), whereas the thin film surface after the polymerization changed largely to the hydrophilic side and its contact angle became constant at about 12° in the case that the concentration of the initiator (the compound having a polymerization initiation site), bromo-containing catechol (BiBDA) is not less than 10 mol %. That is, it was confirmed that grafting PMTAC significantly improved hydrophilicity of the surface. This result was also well compatible with the fact that the composition ratio of the surface determined by the XPS measurement was not less than 10 mol % and was consistent with the theoretical composition ratio of PMTAC. Further, a scanning electron microscope (SEM) image of the cured film surface after the surface-initiated polymerization is shown in FIG. 3B. Observation by scanning electron microscope (SEM) was performed with VE 7800 microscope from Keyence. With respect to surface roughness, root-mean-square surface roughness (RMS) values were calculated from the AFM observation, and it was confirmed to be locally smooth. Furthermore, from the results of the SEM observation, it was confirmed that there is no change before and after the growth of the polymer brushes with respect to a wider area. Further, the length of the polymer brushes was about 120 nm in the dry state when measured through the AFM observation.

Furthermore, the contact angle of a thin film having a ratio of the bromo-containing catechol (BiBDA) of 20 mol % with respect to an oil droplet (n-hexadecane) and the contact angle of the thin film with respect to a bubble (air) in water, are measured before and after MTAC polymerization, in the same manner as described above. The results of the measurement are shown in the following table.

TABLE 3

|  | Before surface-initiated polymerization (polymer coating material precursor) | After surface-initiated polymerization (polymer coating material) | PMTAC directly grown on silicon substrate |
|---|---|---|---|
| Water a) | 64 ± 2° | 12 ± 3° | <5° |
| Bubble (air) in water b) | 129 ± 3° | 148 ± 2° | 153 ± 3° |
| Oil droplet in water c) (n-hexadecane) | 108 ± 3° | 144 ± 3° | 148.9 ± 3° | a) 2 μl,
b) 3 μl,
c) 3 μl

The Contact angle of the thin-film having the ratio of bromo-containing catechol (BiBDA) of 20 mol % with respect to the oil droplet (n-hexadecane) was 108±3° and 144±3° before and after MTAC polymerization, respectively. Further, the contact angle with respect to the bubble (air) in water were 129±3° and 148±2°, respectively. In addition, the contact angle after MTAC polymerization is substantially the same as that when PMTAC was grown directly from the silicon (Si) substrate. From these results, it was confirmed that PMTAC brushes grew on the cured film of the present invention as they conventionally to exhibit sufficient antifouling property.

Example 4

Preparation of Polymer Coating Material Having an Uneven Shape

A nanometer-size uneven shape engraved on a mold was pressed on a thin film of uncured state of a mixture of the urushiol and the bromo-containing catechol compound as described in Example 2, using a nanoimprinting method, to transfer a pattern shape, and then curing was completed, thereby resulting in a preparation of a cured film having a surface unevenness (pattern shape) of 2 μm. Then, surface-initiated polymerization of PMTAC was performed from a polymer coating material precursor consisting of the cured film. AFM images before and after the surface-initiated polymerization of PMTAC are shown in FIGS. 4A(1) and 4A(2) and in FIGS. 4B(1) and 4B(2), respectively. From these AFM images, there was no change in surface morphology and its pillar shape was maintained, even before and after the surface-initiated polymerization. In addition, the results of contact angle measurement with respect to PMTAC polymer brushes having the uneven shape are shown in the following table. From the following results, it was confirmed that existence of the uneven shape enhances hydrophilicity of the polymer brushes.

TABLE 4

|  | After surface-initiated polymerization (polymer coating material) | After surface-initiated polymerization (polymer coating material having pattern shape) |
|---|---|---|
| Water a) | 12 ± 3° | <3 |
| Bubble in water b) (air) | 148 ± 2° | 154 ± 2° |
| Oil droplet in water c) (n-hexadecane) | 144 ± 2° | 150 ± 3° | a) 2 μl,
b) 3 μl,
c) 3 μl

Example 5

Synthesis of a Compound Having a Polymerization Initiation Site Containing a Halogen Group ($IA_1$-$SP_1$—$PI_1$) (2)

As a compound having a polymerization initiation site containing a halogen group ($IA_1$-$SP_1$—$PI_1$), 4-(2-(bromomethyl phenyl oxy) amino ethyl) benzene-1,2-diol represented by the formula (V) wherein X is a bromine atom (Br), was synthesized.

At the beginning, dopamine hydrochloride (1.89 g; 10 mmol) was added to 20 ml of dimethylformamide (DMF) to obtain a cloudy suspension. By adding 1.398 ml of triethylamine (10 mmol) to this cloudy suspension, a clear solution was obtained. After slowly putting, into this clear solution, drops of a DMF solution (25 ml) of N-hydroxysuccinimide (1.38 g; 12 mmol) and 4-bromomethyl-benzoic acid (2.15 g; 10 mmol), 1-ethyl-3-(3-dimethylaminopropyl) carbodiimide hydrochloride (1.917 g; 10 mmol), the resulting solution was stirred for 12 hours at room temperature and a crude product of the target compound was obtained. The obtained crude product was filtered and further the DMF was removed under reduced pressure by 1 mmHg to obtain the target compound ($IA_1$-$SP_1$—$PI_1$), bromo-containing catechol compound.

Example 6

Preparation of a Polymer Coating Material Precursor Containing a Polymerization Initiator As is the case in that the BiBDA of Example 2 described above was used, a cured film (polymer coating material precursor) was prepared under the condition that a ratio of bromo-containing catechol ($IA_1$-$SP_1$—$PI_1$) to urushiol is 20 mol %, that is, under the condition of urushiol (1.20 mmol), bromo-containing catechol compound (0.30 mmol), and iron acetate (II) (0.75 mmol). As is the case with the BiBDA of Example 1 described above, the cured film was applied (coated) to a silicon substrate as a base material to form a thin film and an applied film having a thickness of about 1 micron was obtained. Surface roughness was measured through atomic force microscope (AFM) observation with 5500 microscope from Agilent. The results of the measurement is shown in FIG. 5A(1) and FIG. 5A(2). Almost no change in UV spectra was seen as shown in FIG. 5B. Further, a broad peak in a visible light region is considered to be due to LMCT (Ligand to Metal Charge Transfer)

transition. From the above, it was confirmed that the polymer coating material precursor had not desorbed from the base material. From this result as well, it is considered that the compound having the polymerization initiation site is incorporated into urushiol and is immobilized stably and firmly.

Adhesion of the resulting polymer coating material precursor to other base materials was confirmed through tape peeling test (evaluated according to ASTM D3359). The following table 5 shows the results of the test on a six-point scale [0 (bad) to 5 (excellent)]. The cured film (polymer coating material precursor) was strongly attached to almost all base materials.

TABLE 5

| | | 10 wt. %/ PGMEA Spin | Cast |
|---|---|---|---|
| 1 | Si subjected to vacuum UV treatment | 5 | 5 |
| 2 | Glass slide subjected to vacuum UV treatment | 5 | 5 |
| 3 | PE subjected to vacuum UV treatment | 5 | 5 |
| 4 | PP subjected to vacuum UV treatment | 5 | 3 |
| 5 | PET subjected to vacuum UV treatment | 5 | 5 |
| 6 | PS subjected to vacuum UV treatment | 5 | 5 |
| 7 | Acrylic resin subjected to vacuum UV treatment | 5 | 5 |
| 8 | Copper plate subjected to vacuum UV treatment | 5 | 5 |
| 9 | SUS subjected to vacuum UV treatment | 5 | 5 |
| 10 | Ceramic | 5 | 5 |
| 11 | Melamine resin | 5 | 5 |
| 12 | Phenolic resin subjected to vacuum UV treatment | 5 | 5 |
| 13 | Al subjected to vacuum UV treatment | 5 | 5 |

Further, FIG. 5C shows a scanning electron microscope (SEM) image of the surface of the polymer coating material precursor prepared in the way as described above.

Further, with respect to the above polymer coating material precursor, its contact angle was calculated from a contact angle meter and its surface roughness was confirmed with root-mean-square surface roughness (RMS) values obtained through AFM observation. The results are shown in Table 6. From these results, there was no change in contact angle and surface roughness. Therefore, it was confirmed that the initiator (the compound having the polymerization initiation site) was immobilized on the base material.

TABLE 6

| | Before immersion | After 24 hours immersion in TFE at 60° C. |
|---|---|---|
| Contact angle | 65.6 (0.96) | 67.6 (1.83) |
| root-mean-square surface roughness (RMS) | | |
| (20 nm × 20 nm) | 0.34 nm | 0.34 nm |
| (5 nm × 5 nm) | 0.32 nm ±0.6 nm There is a little grain of 0.6 nm | 0.35 nm ±0.6 nm There are grains of 1 to 8 nm |

Example 7

Synthesis of a Compound Having a Polymerization Initiation Site Containing a Halogen Group ($IA_2$-$SP_2$—$PI_2$)

As a compound having a polymerization initiation site containing a halogen group ($IA_2$-$SP_2$—$PI_2$), (2-bromo-2-methyl) propionyloxy hexyl triethoxysilane (BHE) represented by the above formula (IX) wherein X is a bromine atom (Br), was synthesized.

At the beginning, 25.8 ml (213 mmol) of 5-hexene-1-ol was put in a three-necked flask. After the addition of triethylamine (40.5 ml; 289 mmol) thereto, 100 ml of dichloromethane was added. After cooling the resulting solution to 0° C. using ice bath, 2-bromo isobutyryl bromide (29.8 ml; 236 mmol) was slowly added dropwise. Then, the mixture was returned to room temperature and stirred for 17 hours. The obtained brownish-red liquid was filtered, washed sequentially with saturated aqueous solution of sodium hydrogen, 1N of hydrochloric acid, and water. Finally, the resulting solution was subjected to the addition of magnesium sulfate and was left overnight to remove water, and was further filtered and dried under vacuum to obtain 1-(2-bromo-2-methyl) propionyloxy 5-hexene.

Then, 12.89 g (51.7 mmol) of the resulting 1-(2-bromo-2-methyl) propionyloxy 5-hexene was taken and further 18.8 ml (102 mmol) of triethoxysilane was added. Hereto 2% xylene solution of platinum (0)-1,3-divinyl-1,1,3,3-tetramethyl disiloxane complex was added little by little. Then, the resulting solution was stirred for 48 hours at 20° C. and purified with column chromatography to yield the target compound, (2-bromo-2-methyl) propionyloxy hexyl triethoxysilane (BHE).

Example 8

Preparation of a Polymer Coating Material Precursor Containing a Polymerization Initiator In the same process as in the case of BiBDA of Example 2 described above, a cured film (polymer coating material precursor) was prepared under the condition that a ratio of a compound ($IA_2$-$SP_2$—$PI_2$) having a polymerization initiation site containing a halogen group with respect to urushiol is 20 mol %, that is, under the condition of urushiol (1.20 mmol), the compound ($IA_2$-$SP_2$—$PI_2$) having the polymerization initiation site containing the halogen group (0.30 mmol), and iron acetate (II) (0.75 mmol). As is the case with the BiBDA of Example 1 described above, the cured film was applied (coated) to a silicon substrate as a base material to form a thin film and an applied film having a thickness of about 1 micron was obtained. Surface roughness of the applied film was measured through atomic force microscope (AFM) observation with 5500 microscope from Agilent. The images of the surface roughness were shown in FIG. 6A(1) and FIG. 6(A)2 and the root-mean-square surface roughness (RMS) values of the surface roughness were shown in Table 8. From the images of the AFM, it was shown that BHE (a compound having a polymerization initiation site) was present uniformly (i.e., formed no domain).

<IR Spectrum Measurement>

Figure 6B:
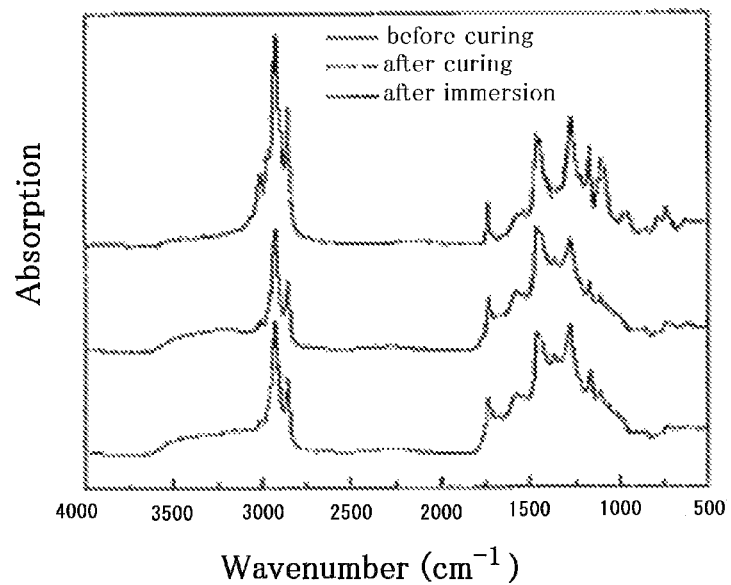
FIG. 6B shows the results of IR Spectrum measurement of the polymer coating material precursor in accordance with the present invention, immediately after spin coating, after curing by heating for 10 minutes at 100° C., and after immersion in solvent TFE.

In the same process as in the case of BiBDA of Example 2 described above, the infrared absorption spectrum (IR) Spectrum measurement results of the polymer coating material precursor immediately after spin coating, after 10 minutes heating at 100° C., and after immersion in TFE, are shown in FIG. 6B. As shown in the figure, the absorption by unsaturated double bonds (vinyl groups) at 3015 $cm^{-1}$ and 945 cm$^{-1}$ had disappeared after curing by heating, which indicates that urushiol formed a crosslinked structure. The absorption by C(=O)O in the vicinity of 1720 cm$^{-1}$ was also retained after curing and after immersion in solvent TFE, which suggests that BHE (the compound having the polymerization initiation site) was incorporated in a crosslinked structure comprising urushiol. Furthermore, since the absorption in the vicinity of 1050 cm$^{-1}$ was observed after the curing by heating, it is understood that Si—O—Si bond was formed and this was retained after the immersion in solvent TFE and therefore BHE (the compound having the polymerization initiation site) was covalently bound to urushiol via alkoxide and was not eliminated even by the immersion. Formation of crosslinked structure was also confirmed from the phenomenon of no scratching of the cured film by pencil hardness test.

<UV Spectrum Measurement>

Figure 6C:
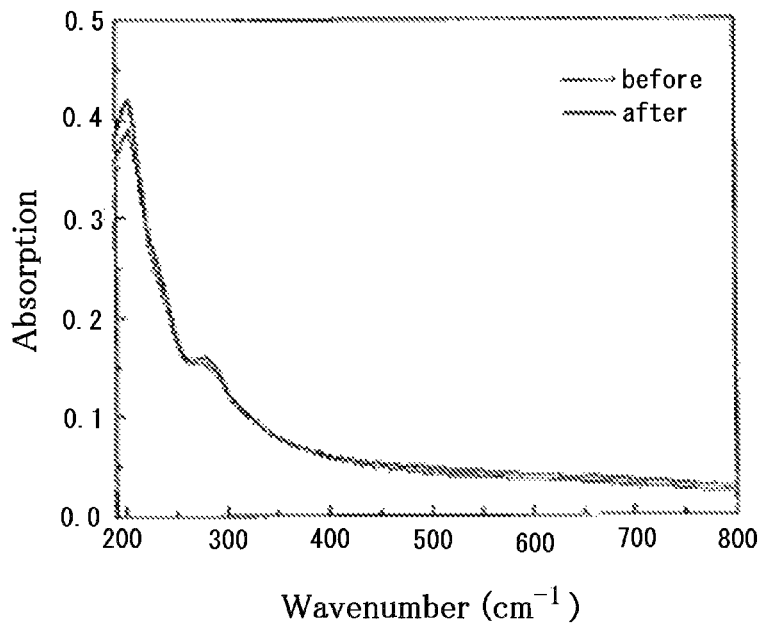
FIG. 6C shows the results of UV spectra before and after immersion of the polymer coating material precursor in accordance with the present invention in solvent TFE for 24 hours at 60° C.

The results of UV spectra before and after immersion the polymer coating material precursor according to the present invention in solvent TFE for 24 hours at 60° C. are shown in FIG. 6C. Almost no change in UV spectra was seen as shown in the figure. Further, a broad peak in a visible light region is considered to be due to LMCT (Ligand to Metal Charge Transfer) transition. From the above, it was confirmed that the polymer coating material precursor had not desorbed from the base material. From this result as well, it is considered that BHE (the compound having the polymerization initiation site containing the halogen group) is incorporated into urushiol and is immobilized stably and firmly.

Adhesion of the resulting polymer coating material precursor to other base materials was confirmed through tape peeling test (evaluated according to ASTM D3359). The following table 5 shows the results of the test on a six-point scale [0 (bad) to 5 (excellent)]. The cured film (polymer coating material precursor) was strongly attached to almost all base materials.

TABLE 7

| | | 10 wt. %/ PGMEA Spin | Cast |
|---|---|---|---|
| 1 | Si subjected to vacuum UV treatment | 5B | 5B |
| 2 | Glass slide subjected to vacuum UV treatment | 5B | 3B Scratch part peeling end does not peel |
| 3 | PE subjected to vacuum UV treatment | 5B | 5B |
| 4 | PP subjected to vacuum UV treatment | 5B | 3B Scratch part peeling end does not peel |
| 5 | PET subjected to vacuum UV treatment | 5B | 5B |
| 6 | PS subjected to vacuum UV treatment | 5B | 5B |
| 7 | Acrylic resin subjected to vacuum UV treatment | 5B | 5B |
| 8 | Copper plate subjected to vacuum UV treatment | 5B | 5B |
| 9 | SUS subjected to vacuum UV treatment | 5B | 5B |
| 10 | Ceramic | 5B | 3B Scratch part peeling end does not peel |
| 11 | Melamine resin | 5B | 5B |
| 12 | Phenolic resin subjected to vacuum UV treatment | 5B | 5B |
| 13 | Al subjected to vacuum UV treatment | 5B | 5B |

Further, scanning electron microscope (SEM) images of the surface of the polymer coating material precursor prepared in the way as described above are shown in FIG. 7(A) and FIG. 7(B).

Further, with respect to the above polymer coating material precursor, its contact angle was calculated from a contact angle meter and its surface roughness was confirmed with root-mean-square surface roughness (RMS) values obtained through AFM observation. The results are shown in Table 8. From these results, it has been confirmed that there was no change in contact angle and surface roughness. Further, since almost no change in weight before and after immersion in TFE by quartz crystal microbalance (QCM) was observed, it was confirmed that initiator (the compound having the polymerization initiation site) was immobilized on the base material. Therefore, it is considered that in the polymer coating material precursor as described above, BHE (the compound having the polymerization initiation site containing the halogen group) is stably and firmly incorporated in the crosslinked structure comprising urushiol.

TABLE 8

| | Iron-containing urushiol (FeUrushiol)_20 mol % BHE Flat C18 Press | |
|---|---|---|
| Sample # | Before immersion | After 24 hours immersion in TFE at 60° C. |
| Contact angle (°) | 69.7 (1.98) | 68.7 (2.52) |
| root-mean-square surface roughness (RMS)  20 nm × 20 nm | 0.36 nm (recess: 2.11 nm) | 0.42 nm 0.39 nm 0.63 nm 0.47 nm |
| 5 nm × 5 nm | 0.33 nm | 0.35 nm |
| quartz crystal microbalance: QCM (MHz) | 10,410 | 10,039 (−371) |

The invention claimed is:

1. A composite material characterized in that a compound having a polymerization initiation site, the polymerization initiation site containing a halogen group, is incorporated in a crosslinked structure formed by a catechol derivative or a phenol derivative represented by the following formula (I),

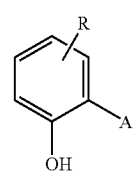

(I)

wherein
in the formula (I), R is in the 3-position or 4-position, may be interrupted by an oxygen molecule, and represents a hydrocarbon group with 2 to 20 carbons that has at least one double bond site, and A represents a hydrogen atom, a hydroxyl group, or an alkoxy group with 1 to 20 carbons.

2. The composite material according to claim 1, wherein the catechol derivative or the phenol derivative is urushiol represented by the following formula (III),

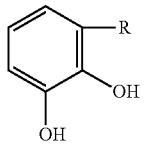
(III)

wherein in the formula (III), R is the same as defined with respect to formula (I).

3. The composite material according to claim 1, characterized in that the compound having the polymerization initiation site, the polymerization initiation site containing the halogen group, is represented by the following formula (II-1), $$IA_1\text{-}SP_1\text{—}PI_1 \quad (II\text{-}1)$$

wherein
in the formula (II-1), IA$_1$ is represented by the following formulae (VI-1) or (VI-2),

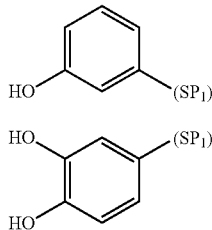
(VI-1)
(VI-2)

wherein
in the formula (II-1), PI$_1$ is the polymerization initiation site containing the halogen group and is represented by the following formula (VII-1), (VII-2), or (VII-3),

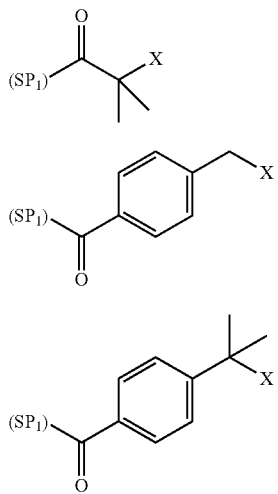
(VII-1)
(VII-2)
(VII-3)

wherein in the above formulae, X represents a halogen atom wherein
in the formula (II-1), SP$_1$ is a spacer site that links the IA$_1$ with the PI$_1$ and is represented by the following formula (VIII-1) or formula (VIII-1'),

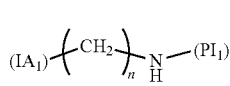
(VIII-1)

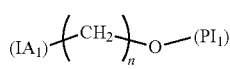
(VIII-1')

wherein in the above formulae, n represents an integer ranging from 0 to 10.

4. The composite material according to claim 3, characterized in that X is a bromine atom or a chlorine atom and n is an integer ranging from 1 to 8.

5. The composite material according to claim 4, characterized in that X is a bromine atom and n is an integer ranging from 2 to 6.

6. The composite material according to claim 5, wherein the compound having the polymerization initiation site, the polymerization initiation site containing the halogen group, is represented by the following formula (IV), (V), (IV'), or (V')

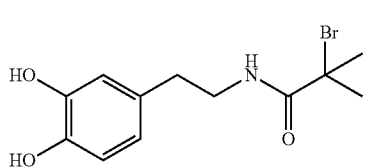
(IV)

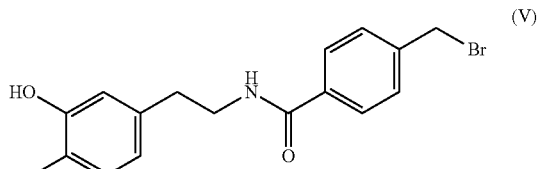
(V)

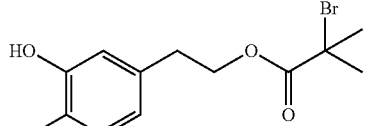
(IV')

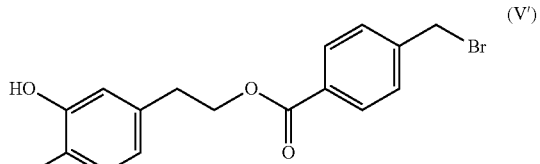
(V')

7. The composite material according to claim 1, characterized in that the compound having the polymerization initiation site, the polymerization initiation site containing the halogen group, is represented by the following formula (II-2), $$IA_2\text{-}SP_2\text{—}PI_2 \quad (II\text{-}2)$$

wherein
in the formula (II-2), IA$_2$ is represented by the following formula (VI-3) or (VI-4),

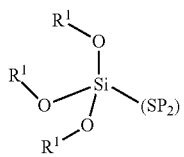

(VI-3)

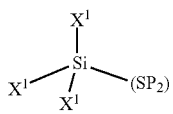

(VI-4)

wherein in the above formulae, R$^1$ represents an alkyl group with 1 to 6 carbons,
X$^1$ represents a halogen atom
wherein
in the formula (II-2), PI$_2$ is the polymerization initiation site containing the halogen group and represented by the following formula (VII-1'), formula (VII-2'), or formula (VII-3'),

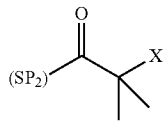

(VII-1')

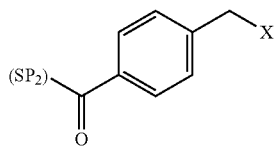

(VII-2')

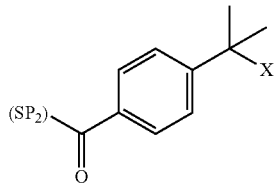

(VII-3')

wherein in the above formulae, X represents a halogen atom
wherein
in formula (II-2), SP$_2$ is a spacer site that links the IA$_2$ with the PI$_2$ and represented by the following formula (VIII-2) or formula (VIII-2'),

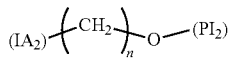

(VIII-2)

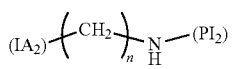

(VIII-2')

wherein in the above formulae, n represents an integer ranging from 0 to 10.

8. The composite material according to claim 7, characterized in that R$^1$ is an alkyl group with 1 to 5 carbon, X is a chlorine atom or a bromine atom, X$^1$ is a chlorine atom or a bromine atom, and n is an integer ranging from 1 to 8.

9. The composite material according to claim 8, characterized in that R$^1$ is an alkyl group with 1 to 4 carbons, X is a bromine atom, X$^1$ is a chlorine atom, and n is an integer ranging from 2 to 6.

10. The composite material according to claim 9, wherein the compound having the polymerization initiation site containing the halogen group is represented by the following formula (IX), (X), or (XI)

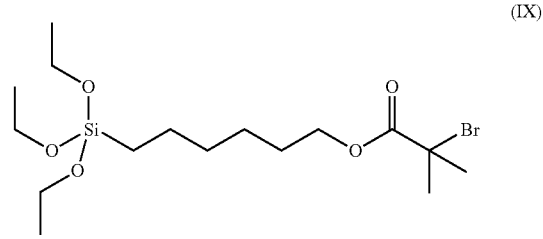

(IX)

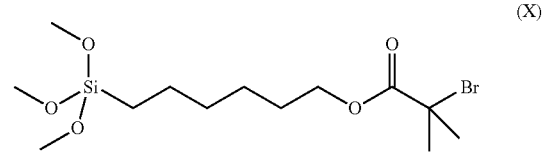

(X)

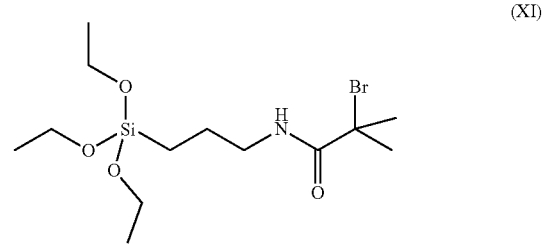

(XI)

11. A polymer coating material precursor characterized in that a cured film composed of the composite material according to claim 1 is bonded to a base material.

12. A polymer coating material characterized in that a monomer having a vinyl group is subject to surface-initiated polymerization by atom transfer radical polymerization (ATRP) in which a halogen group present in the polymer coating material precursor according to claim 11 is set as a polymerization initiation point.

13. The polymer coating material according to claim 12, characterized in that the monomer having the vinyl group is 2-(methacryloyloxy) ethyl trimethyl ammonium chloride (MTAC) and is subject to surface-initiated polymerization to result in modification of surface hydrophilicity.

14. The polymer coating material according to claim 13, characterized in that a polymer has polymerized units of MTAC (2-(methacryloyloxy) ethyl trimethyl ammonium chloride) and said coating material having a contact angle of 12° or less with respect to water.

15. A method of manufacturing the composite material according to claim 1, characterized by comprising a step of mixing the catechol derivative or the phenol derivative represented by the above formula (I) with the compound having the polymerization initiation site containing the halogen group and curing the resultant mixture.

* * * * *